(12) United States Patent
Heckmeier et al.

(10) Patent No.: US 7,440,160 B2
(45) Date of Patent: Oct. 21, 2008

(54) ELECTRO-OPTICAL LIGHT MODULATING ELEMENT, ELECTRO-OPTICAL DISPLAY AND MODULATING MEDIUM

(75) Inventors: Michael Heckmeier, Hemsbach (DE); Markus Czanta, Darmstadt (DE); Achim Goetz, Alsbach-Haehnlein (DE); Peer Kirsch, Kanagawa (JP); Louise Diane Farrand, Dorset (GB); Andreas Taugerbeck, Darmstadt (DE); Elvira Montenegro, Weinheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/535,104

(22) PCT Filed: Nov. 12, 2003

(86) PCT No.: PCT/EP03/12626

§ 371 (c)(1),
(2), (4) Date: May 16, 2005

(87) PCT Pub. No.: WO2004/046805

PCT Pub. Date: Jun. 3, 2004

(65) Prior Publication Data

US 2006/0050354 A1    Mar. 9, 2006

(30) Foreign Application Priority Data

| Nov. 15, 2002 | (DE) | ................................ 102 53 606 |
| Mar. 27, 2003 | (DE) | ................................ 103 13 979 |
| Aug. 8, 2003 | (DE) | ................................ 103 36 783 |

(51) Int. Cl.
*G02F 1/00* (2006.01)
*C12N 1/38* (2006.01)

(52) U.S. Cl. ...................... 359/322; 359/245; 359/295; 435/243; 435/244; 435/395

(58) Field of Classification Search ................. 359/295, 359/245, 321, 322; 435/244, 395, 243
See application file for complete search history.

(56) References Cited

U.S. PATENT DOCUMENTS

| 3,795,436 | A | | 3/1974 | Boller et al. |
| 4,818,076 | A | | 4/1989 | Heppke et al. |
| 5,368,770 | A | * | 11/1994 | Saupe et al. ............ 252/299.01 |
| 5,629,784 | A | * | 5/1997 | Abileah et al. ............... 349/112 |
| 5,786,876 | A | | 7/1998 | Ota et al. |
| 6,171,519 | B1 | * | 1/2001 | Nonaka et al. ......... 252/299.61 |
| 6,421,107 | B1 | * | 7/2002 | Greenfield et al. .......... 349/115 |

FOREIGN PATENT DOCUMENTS

| DE | 32 44 885 | 6/1984 |
| EP | 1 122 587 | 8/2001 |
| WO | WO 02 093244 | 11/2002 |

OTHER PUBLICATIONS

"Polymer-stabilized liquid crystal blue phases," Hirotsugu Kikuchi et al., nature materials—vol. 1—Sep. 2002—pp. 64-68.
H. Kikuchi et al.: "Polymer-Stabilized Liquid Crystal Blue Phases" Nature Materials, Bd. 1, Sep. 2, 2002, pp. 64-68.
Kitzerow H-S: "The Effect of Electric Fields on Blue Phases" Molecular Crystals and Liquid Crystals, Gordon and Breach, London, GB, Bd. 202, Jul. 22, 1990, pp. 51-83.
K. Tarumi, et al.: "Advanced Liquid-Crystal Materials for TFT Monitor and TV Applications" Journal of the Society for Information Display, Bd. 10, Nr. 2, Jun. 5-7, 2001.

* cited by examiner

*Primary Examiner*—Evelyn A. Lester
(74) *Attorney, Agent, or Firm*—Millen, White, Zelano & Branigan, P.C.

(57) ABSTRACT

The invention relates to electrooptical light modulating elements, to electrooptical displays containing elements of this type, and to display systems, e.g. television screens and computer monitors, and to the modulating media used therein. The inventive light modulating elements contain a mesogenic modulating medium that exists in an optically isotropic phase when the light modulating elements are in operation and, in addition to having a good contrast, a low dependency on the viewing angle and very short switching times, they are particularly characterized by having relatively low driving voltages with a very low dependency on temperature. The inventive modulating media are characterized in that they contain a chiral constituent. They preferably also contain an achiral constituent. Especially preferred, the control media comprise a blue phase.

21 Claims, No Drawings

ELECTRO-OPTICAL LIGHT MODULATING ELEMENT, ELECTRO-OPTICAL DISPLAY AND MODULATING MEDIUM

FIELD OF THE INVENTION

The present invention relates to light modulation elements, to displays containing same, and to light modulation media. The light modulation elements preferably use modulation media which have anisotropic properties at certain temperatures, such as, for example, liquid crystals. The light modulation elements are operated at a temperature at which the modulation media are in the blue phase. Similar displays which use modulation media which are in the isotropic phase are described in DE 102 17 273.0 and in the hitherto unpublished patent applications DE 102 41 301.0 of 04.09.2002, two further applications by the applicant of the present application.

The present invention relates to an electro-optical light modulation element and to electro-optical displays and display systems containing elements of this type, such as, for example, television screens and computer monitors, and to the modulation media used in the light modulation elements. The light modulation elements according to the invention contain a mesogenic modulation medium which is in the blue phase during operation of the light modulation elements. Besides good contrast and low viewing-angle dependence of the contrast, short response times and relatively low operating voltage, they are particularly distinguished by low temperature dependence of the operating voltage.

In particular, the present invention also relates to mesogenic media and to the use thereof as modulation media in light modulation elements of this type.

OBJECT AND PRIOR ART

Conventional electro-optical liquid-crystal displays are known in general terms. They are operated at a temperature at which the modulation medium is in an optically anisotropic mesophase. In most display types, the modulation media are used in the nematic phase. In the mesophase, the modulation media, generally even without application of an electric field, have anisotropic properties, such as, for example, birefringence (Δn). This is not only induced just when an electric field is applied. The most widespread are TN ("twisted nematic") and STN ("super twisted nematic") displays. The liquid-crystal cells in these displays have electrodes on the substrates on the two opposite sides of the liquid-crystal medium. The electric field is thus essentially perpendicular to the liquid-crystal layer. The first-mentioned displays in particular are used in combination with TFT ("thin film transistor") addressing for displays having a large information content and high resolution, for example in laptop and notebook computers. Use has recently increasingly been made, in particular in desktop computer monitors, of liquid-crystal displays of the IPS ("in-plane switching", for example DE 40 00 451 and EP 0 588 568) type or alternatively of the VAN ("vertically aligned nematic") type. VAN displays are a modern variant of the ECB ("electrically controlled birefringence") displays. In a further modern variant, the MVA ("multidomain vertically aligned") displays, a plurality of domains is stabilised per addressed electrode, and in addition a special optical compensation layer is used. These displays, like the TN displays already mentioned, use an electric field perpendicular to the liquid-crystal layer. In contrast thereto, IPS displays generally use electrodes on only one substrate, i.e. on one side of the liquid-crystal layer, i.e. are characterised by a significant component of the electric field parallel to the liquid-crystal layer.

All conventional displays have relatively long response times, in particular the response times are often not sufficiently short for TV and multimedia applications, which are becoming ever more widespread. This is particularly striking in comparison with the hitherto virtually ubiquitous cathode-ray tubes. A further disadvantage of the known electro-optical effects employed in liquid-crystal displays is the viewing-angle dependence of the contrast achieved, which is clearly pronounced in most types. In most cases, this is so great that compensation layers, typically anisotropic films, in some cases with a complex structure, generally have to be used for displays operated with direct viewing.

DE 102 17 273.0 describes light modulation elements in which the mesogenic modulation medium is in the isotropic phase at the operating temperature. These light modulation elements switch particularly quickly and have good viewing-angle dependence of the contrast. However, the driving voltages are too high for many applications. The demand therefore exists for improved light modulation elements, in particular having a reduced driving voltage.

DE 102 41 301.0, a further, hitherto unpublished application by the applicant of the present application, proposes special electrode structures which result in a significant reduction in the operating voltages. However, these electrode structures require considerably more work during production of the light modulation elements.

The light modulation elements proposed in DE 102 17 273.0 and DE 102 41 301.0 additionally have pronounced temperature dependence. The electro-optical effect induced by the electric field in the modulation media in the isotropic phase is most highly pronounced at temperatures close to the clearing point of the modulation media. This is where the light modulation elements have the lowest characteristic voltages, i.e. where the lowest operating voltages are required. With increasing temperature, the characteristic voltages and thus the operating voltage increase significantly. Typical temperature dependences of the threshold voltage are in the range from a few volts per degree to ten or more volts per degree. To a first approximation, the relative temperature dependence of the characteristic voltages of the various light modulation elements containing an isotropic modulation medium in accordance with DE 102 17 273.0 and DE 102 41 301.0 can be regarded as being independent of the medium employed and of the electrode structure. DE 102 17 273.0 describes isotropic media having some significantly varying compositions which can be employed in light modulation-elements which are operated in the isotropic phase, whereas DE 102 41 301.0 discloses various electrode structures. The relative temperature dependence of the threshold voltage is in the order of 50%/degree at a temperature of 10 above the clearing point. It drops with increasing temperature. At a temperature of 5° above the clearing point, it is in the order of a few 10%/degree.

For the light modulation elements used in practical displays, this temperature dependence of the electro-optical effect is usually too great. In general, there is a desire for effects whose operating voltages are virtually independent of the operating temperature over a temperature range of at least a few degrees, preferably over 5° or more, particularly preferably over 10° or more and very particularly preferably over 20° or more.

The alternative development of electronic following of the driving voltage is relatively complex. On the one hand, it generally results in loss of part of the available driving voltage, since this must after all still be sufficiently large even at the highest operating temperature. On the other hand, it is associated with some measurement and control effort. Thus, the current temperature of the light modulation element must be determined. In displays having a relatively large area, it may even be necessary to determine a temperature gradient or the temperatures at a plurality of points of the display.

The further alternative of keeping the temperature of the light modulation elements constant likewise cannot be achieved easily. For clear practical reasons, the display must be heated for this purpose. This alternative likewise requires determination of the temperature of the light modulation elements.

The advantage of particularly good contrast of the displays described in DE 102 17 273.0 which use an isotropic modulation medium thus cannot readily be utilised in practice.

It can thus be seen that a great demand exists for light modulation elements which use a modulation medium in an optically isotropic phase and which exhibit low temperature dependence of the characteristic voltages.

Liquid crystals having a correspondingly great chiral twist can have one or more optically isotropic mesophases. These phases appear slightly bluish at a corresponding cholesteric pitch, i.e. if the pitch is in the region of the wavelength of visible light, in a sufficiently large layer thickness. For this reason, they are known as blue phases (Gray and Goodby, "Smectic Liquid Crystals, Textures and Structures", Leonhard Hill, USA, Canada (1984)).

The effects of electric fields on liquid crystals which are in a blue phase are described, for example, in H. S. Kitzerow, "The Effect of Electric Fields on Blue Phases", Mol. Cryst. Liq. Cryst, (1991), Vol. 202, pp. 51-83. Three types of blue phase (BP I to BP III) which can be observed in field-free liquid crystals are mentioned therein. However, electro-optical displays which utilise field-induced birefringence are not described. Under the influence of an electric field, further blue phases or other phases which are different from blue phases I, II and III may arise.

The present invention thus had the object of developing particularly fast-switching light modulation elements which use a modulation medium which is in an optically isotropic phase in the field-free state, having good contrast, good viewing-angle dependence, low driving voltages and in particular having low temperature dependence of the driving voltage and providing the modulation media required for this purpose. These light modulation elements should have a layer thickness of the modulation media which is as small as possible in order to be suitable for use as elements of FPDs (flat panel displays), such as, for example, flat panel screens for computers. They should furthermore be addressable by means of an electrode configuration which is as simple as possible.

PRESENT INVENTION

Surprisingly, it has been found that, as described below, light modulation elements which, like the light modulation elements described in the unpublished application DE 10217273.0, use modulation media in an optically isotropic phase can be significantly improved by using modulation media which are in the blue phase. In particular, light modulation elements having significantly reduced temperature dependence of the characteristic voltages and thus of the operating voltage can thus be achieved.

The electro-optical light modulation elements in accordance with the present invention comprise
one or more, preferably one or two, particularly preferably two, substrates,
an electrode arrangement,
one or more element for polarisation of the light and
a modulation medium, and are characterised in that
the light modulation element is operated at a temperature at which the modulation medium in the unaddressed state is in an optically isotropic phase and in that
the mesogenic modulation medium comprises a chiral component, component (A), which consists of one or more chiral compounds and
optionally, preferably obligatorily, an achiral component, component (B), which consists of one or more achiral compounds and
the mesogenic modulation medium is operated at the temperature at which the light modulation element has a blue phase or
the mesogenic modulation medium is operated at the temperature at which the light modulation element is in the isotropic phase and
optionally the electrode arrangement is able to generate an electric field having a significant component parallel to the surface of the mesogenic modulation medium.

Preference is given to the use of an electrode arrangement which is able to generate an electric field having a significant component parallel to the surface of the mesogenic modulation medium.

The present invention is explained in greater detail below.

The modulation medium used in the light modulation element is preferably a mesogenic medium. In the present application, the term mesogenic media or compounds denotes media or compounds which have a mesophase, are soluble in a mesophase or induce a mesophase. The mesophase is a smectic phase, a nematic phase or a blue phase. The smectic phase and the nematic phase here are preferably chiral. In the present application, the terms "chiral nematic phase" and "cholesteric phase" are used synonymously, unless expressly stated otherwise. The term "blue phase" denotes any of the known blue phases and also covers a plurality of these phases simultaneously, unless expressly stated otherwise.

On application of an electric field, field-induced phases, such as, for example, BPH and BPX, may arise. In the case of electric fields of high field strength, a phase transition into a phase which arises at a relatively low temperature without an electric field is furthermore possible. Determination of the phases for characterisation of the materials, particularly of the modulation media themselves, relates to the case where no electric field is applied, whereas determination of the phases in the case of characterisation of the light modulation elements is carried out with application of a corresponding voltage, in general the operating voltage, or the threshold voltage, unless expressly stated otherwise. The transition temperature T(*,BP) is determined in the field-free state, whereas the transition temperature T(BP,I) is determined with application of an electric field, from the change in the increase in the temperature dependence of the characteristic voltages of the light modulation elements.

The modulation media preferably have a blue phase, particularly preferably a blue phase and a further mesophase, preferably a cholesteric phase.

The preferred medium used for investigating the mesogenic properties of the materials which do not have a mesophase is nematic mixture ZLI-4792 from Merck KGaA, Darmstadt, Germany. The mesogenic materials preferably have a clearing point, extrapolated from a 10% solution in this mixture, of −50° C. or above, particularly preferably of −20° C. or above and very particularly preferably of 0° C. or above.

The modulation medium comprises a chiral doping component, component (A), and optionally an achiral component, component (B).

The chiral component (A) comprises one or more chiral compounds, preferably consists of these compounds. These chiral compounds have a mesogenic structure and preferably themselves have one or more mesophases, preferably at least one cholesteric phase.

In a first embodiment of the present invention, the mesogenic modulation medium consists only of the chiral component (A). In this case, the modulation medium comprises one or more, preferably two or more, particularly preferably three, four or more, chiral compounds. The modulation medium preferably comprises one or more compounds which preferably have a cholesteric phase. In certain embodiments, however, the modulation medium may also advantageously comprise one or more chiral compounds, of which one, more or all themselves have no mesophase. In this case, preference is given to chiral compounds which have a melting point above ambient temperature since they can be handled better. In addition, particular preference is in this case given to compounds having a high HTP, i.e. compounds which induce a short cholesteric pitch even when used in low concentrations in nematic host mixtures.

In a particularly preferred embodiment, which may be identical with the embodiments described above, particularly with the embodiment described in the last paragraph, only one or two chiral compounds, preferably only one chiral compound, are employed.

In a further, preferred embodiment of the present invention, the mesogenic modulation medium consists of a chiral component (A) and an achiral component (B). In this case, the chiral component comprises one or more, preferably two or more, chiral compounds and the achiral component (B) comprises one or more, preferably two or more, particularly preferably three, four or more, achiral compounds.

In a preferred embodiment, a chiral compound has or a plurality of the chiral compounds of component (A) have a mesophase, preferably a cholesteric phase. In this embodiment, the chiral compounds influence the physical properties of the mesogenic achiral component (B), such as, for example, the clearing point, the birefringence and the dielectric anisotropy, relatively little, and it is also correspondingly possible to employ large concentrations of the chiral component (A), which enables the use of compounds of relatively low HTP. The physical properties of the mesogenic, achiral component (B), such as, for example, the clearing point, the birefringence and the dielectric anisotropy, are changed relatively little so long as the cholesteric pitch is sufficiently long, generally much larger than the wavelength of light.

In another preferred embodiment, the chiral compound has or the chiral compounds of component (A) have no mesophase. This embodiment is particularly preferred if the chiral component (A) has a high HTP in the achiral component (B), since the desired low cholesteric pitch can then be obtained with a small concentration of the chiral component (A), which results in the physical properties of the modulation medium, such as, for example, the clearing point, the birefringence and the dielectric anisotropy, being changed only little compared with those of the achiral component (B).

If, however, the cholesteric pitch in one of the two embodiments described in the two preceding paragraphs or in another embodiment adopts relatively low values, in the order of the wavelength of light, the chiral component (A) induces in the mesogenic medium a completely different phase, a blue phase, whose structure are completely different from that of the nematic and cholesteric phases.

The physical properties, such as, for example, the clearing point, the birefringence and the dielectric anisotropy, of the media which comprise both the chiral component (A) and the achiral component (B) are generally not accessible using the conventional methods for nematic liquid-crystal mixtures. In this case, in order to determine the corresponding physical properties, the chiral component (A) is replaced by an achiral component (A') with the same concentration. The achiral component (A') comprises the same compound or the same compounds in the same concentrations as component (A). In contrast to component (A), however, component (A') does not comprise the chiral compounds, but instead the corresponding racemates, i.e. a non-chiral mixture of the respective two corresponding enantiomers of each of the compounds in the ratio 1:1.

The blue phase occurs in the medium which comprises both component (A) and component (B).

One or more of the achiral compounds of component (B) preferably have a mesophase, preferably a smectic and/or nematic phase, preferably a nematic phase.

In a preferred embodiment of the present invention, the achiral component (B) makes up the predominant part of the modulation medium. In this embodiment, the concentration of the chiral component in the modulation medium is preferably 0.5% to 45%, particularly preferably 1% to 35% and very particularly preferably 3% to 25%.

In this embodiment, the cholesteric pitch of the modulation medium in the cholesteric phase, also referred to as the chiral nematic phase, can be reproduced to a first approximation by equation (1).

$$P = (HTP \cdot c)^{-1} \qquad (1)$$

in which
P denotes the cholesteric pitch,
c denotes the concentration of the chiral component (A) and
HTP (helical twisting power) denotes a constant which characterises the twisting power of the chiral substance and depends on the chiral substance (component (A)) and on the achiral component (B).

If the pitch is to be determined more accurately, equation (1) can be correspondingly modified. To this end, the development of the cholesteric pitch in the form of a polynomial (2) is usually used.

$$P = (HTP \cdot c)^{-1} + (\alpha_1 \cdot c)^{-2} + (\alpha_2 \cdot c)^{-3} + \qquad (2)$$

in which the parameters are as defined above for equation (1) and
$\alpha_1$ and $\alpha_2$ denote constants which depend on the chiral component (A) and on the achiral component (B).

The polynomial can be continued to the degree which enables the desired accuracy.

If the chiral component (A) consists of two or more compounds, equation (1) is modified to give equation (3).

$$P = [\Sigma_i (HTP(i) \cdot c_i)]^{-1} \qquad (3)$$

in which
P denotes the cholesteric pitch,
$c_i$ denotes the concentration of the i-th compound of the chiral component (A) and
HTP(i) denotes the HTP of the i-th compound of the chiral component (A) in the achiral component (B).

The temperature dependence of the HTP is usually also represented in a polynomial development (4), which can often be terminated right after the linear element.

$$HTP(T) = HTP(T_0) + \beta_1 \cdot (T - T_0) + \beta_2 \cdot (T - T_0)^2 + \qquad (4)$$

in which the parameters are as defined above for equation (1) and

T denotes the temperature,
$T_0$ denotes the reference temperature,
HTP(T) denotes the HTP at temperature T,
HTP($T_0$) denotes the HTP at temperature $T_0$ and
$\beta_1$ and $\beta_2$ denote constants which depend on the chiral component (A) and on the achiral component (B).

In a preferred embodiment of the present invention, the chiral component (A) comprises one or more chiral compounds having an HTP (helical twisting power) in the commercial, nematic host mixture MLC-6260 from Merck KGaA, Darmstadt, of 10 $\mu m^{-1}$ or more, preferably of 30 $\mu m^{-1}$ or more, particularly preferably of 50 $\mu m^{-1}$ or more and very particularly preferably of 90 $\mu m^{-1}$ or more.

In a preferred embodiment of the present invention, the chiral component (A) comprises two or more chiral compounds. The chiral compounds preferably all have the same sign of the HTP.

The modulation medium preferably has a characteristic temperature, in a preferred embodiment a clearing point, in the range from −30° C. to 80° C., preferably up to 55° C.

The light modulation elements according to the invention preferably contain a mesogenic medium which is in the blue phase at the operating temperature. This medium is advantageously located on or below a substrate.

In general, the modulation medium is located between two substrates. This embodiment is preferred. If the modulation medium is located between two substrates, at least one of these substrates is light-transparent. The light-transparent substrate or the light-transparent substrates may, for example, consist of glass, quartz or plastic. If a non-light-transparent substrate is used, this may consist, inter alia, of a metal or a semiconductor. These media can be used as such or can be located on a support, for example a ceramic. If the modulation medium is a polymeric medium, the use of a second substrate can, if desired, be omitted. Polymeric modulation media can even be produced in self-supporting form. In this case, no substrate at all is necessary. In this case, just as in the case of the use of exclusively flexible substrates, flexible light modulation elements can be achieved.

The operating temperature of the light modulation element is preferably above the characteristic temperature of the modulation medium, in general above the transition temperature of the modulation medium into the blue phase, in general in the range from 0.1° to 50° above this temperature, preferably in the range from 0.1° to 10° above this temperature and particularly preferably in the range from 0.1° to 5° above this temperature. The operating temperature is preferably in the range which extends from the transition temperature of the modulation medium into the blue phase to the transition temperature of the modulation medium into the isotropic phase, the clearing point. However, the light modulation elements can, as described in DE 101 17 273.0, also be operated at temperatures at which the modulation medium is in the isotropic phase. Then, however, the temperature dependence of the operating voltage increases, which is generally undesired.

The operating temperature range of the light modulation elements according to the invention preferably extends at least over a temperature range of 5° or more, preferably of 20° or more, preferably of 30° or more, preferably of 40° or more, particularly preferably of 60° or more and very particularly preferably of 80° or more. The operating temperature range of the light modulation elements according to the invention preferably extends at least from 10° C. or below to 50° C. or above, preferably at least from 0° C. or below to 60° C. or above, particularly preferably at least from −20° C. or below to 80° C. or above, very particularly preferably at least from −30° C. or below to 100° C. or above and most preferably at least from −40° C. or below to 120° C. or above.

In a preferred embodiment, the operating temperature range of the light modulation elements according to the invention relative to the characteristic temperature of the modulation medium extends at least up to 50° C. or more above the characteristic temperature, particularly preferably at least from −5° C. or less below the characteristic temperature to 60° C. or more above the characteristic temperature and very particularly preferably at least from −10° C. or less below the characteristic temperature to 80° C. or more above the characteristic temperature.

On application of a voltage, an alignment is induced in the mesogenic medium in the optically isotropic phase, which results in optical retardation, which can be visualised in a known manner, for example, and preferably between crossed polarisers. An inhomogeneous electric field is preferably used.

The light modulation elements according to the invention contain at least one element for polarisation of the light. In addition, they preferably contain a further optical element. This further optical element is either a second element for polarisation of the light, a reflector or a transflector.

The optical elements are arranged in such a way that the light, on passing through the mesogenic medium of the light modulation element, passes at least once through at least one polarising element both before entering the mesogenic medium and after exiting from the mesogenic medium.

In a preferred embodiment of the light modulation element in accordance with the present invention, the mesogenic medium is located between two polarisers, i.e. a polariser and an analyser. Two linear polarisers are preferably used. In this embodiment, the absorption axes of the polarisers are preferably crossed and preferably form an angle of 90°.

The light modulation element according to the invention optionally contains one or more birefringent layers. It preferably contains one λ/4 layer or a plurality of λ/4 layers, preferably one λ/4 layer. The optical retardation of the λ/4 layer is preferably about 140 nm.

The layer thickness (d) of the mesogenic modulation medium is preferably 0.1 μm to 5000 μm (i.e. 5 mm), particularly preferably 0.5 μm to 1000 μm (i.e. 1 mm), particularly preferably 1.0 μm to 100 μm and very particularly preferably 1.5 μm, preferably 3.0 μm, to 30 μm and in particular 2.0 μm, preferably 3.5 μm, to 20 μm. In a preferred embodiment, the layer thickness of the mesogenic modulation medium is preferably 0.5 μm to 50 μm, particularly preferably 1.0 μm to 20 μm and very particularly preferably 1.0 μm to 8.0 μm.

The present invention also relates to electro-optical displays which contain one or more light modulation elements according to the invention. These electro-optical displays are preferably addressed by means of an active matrix.

The present invention furthermore relates to electro-optical display systems containing one or more electro-optical displays according to the invention. These electro-optical display systems are preferably used for the display of information, inter alia preferably as television screen or as computer monitor. The information to be displayed is preferably digital signals or video signals.

The light modulation element according to the invention may additionally contain one or more further conventional optical elements, such as birefringent layers (for example compensation layers), diffuser layers and elements for increasing the brightness and/or the light yield and/or the viewing-angle dependence, this list not being definitive.

The light modulation elements according to the invention are characterised by good contrast, which is highly and virtually predominantly dependent on the properties of the polarisers used. For comparison with conventional TN cells, the TN cells used here have an optical retardation of 0.50 µm, positive contrast and the absorption axis of the polarisers perpendicular to the preferential alignment of the nematic liquid crystals at the adjacent substrate and contain non-chiral liquid crystals. The contrast of the light modulation elements according to the invention depends, inter alia, in particular on the shape, type and structure of the electrodes used. If the same polarisers are used in the light modulation elements according to the invention and in these conventional TN cells, the contrast of the light modulation elements according to the invention is generally 20% or more, in some cases, especially at observation angles which differ greatly from the display surface perpendicular, 40% or more greater than the contrast of the TN cells.

The viewing-angle dependence of the contrast of the light modulation elements according to the invention is very good. It is significantly better than that of the known ECB cells. It is more comparable with the viewing-angle dependence observed in commercially available IPS displays (for example from Hitachi and NEC, both from Japan) and MVA displays (for example from Fujitsu, Japan). It is much lower than that of conventional TN displays.

Thus, an isocontrast curve for a given contrast ratio in the light modulation elements according to the invention generally includes a range of angles which is more than twice as large, often even more than three times as large, as the corresponding isocontrast curve for the same contrast ratio in the TN display.

The response times of the light modulation elements according to the invention are very short. They are generally at values of 5 ms or less, preferably at 1 ms or less, particularly preferably at 0.5 ms or less and very particularly preferably at 0.1 ms or less.

It is particularly advantageous that on switching between different grey shades, the response time, in particular for switching on, are virtually independent of the driving voltage used. This represents a significant advantage over conventional light modulation elements, such as liquid-crystal cells, for example TN cells.

The electro-optical characteristic line was characterised by characteristic voltages. To this end, use was made, in particular, of the voltages at which 10%, 50% and 90% relative contrast is achieved. These voltages ($V_{10}$, $V_{50}$ and $V_{90}$ for short) are also known as the threshold, mid-grey and saturation voltage respectively. In addition, the voltage at which 70% relative contrast is achieved ($V_{70}$) was generally determined.

Electro-optical displays in accordance with the present invention contain one or more light modulation elements according to the invention. In a preferred embodiment, these are addressed by means of an active matrix.

In another preferred embodiment, the light modulation elements according to the invention are addressed in so-called "field sequential mode". Here, the switching elements are illuminated successively with light of different colours synchronously with the addressing. In order to produce the pulsed coloured light, a colour wheel, stroboscope lamps or flash lamps, for example, can be employed.

Electro-optical displays in accordance with the present invention may, in particular if they are used for television screens, computer monitors or the like, contain a colour filter for the display of coloured images. This colour filter advantageously consists of a mosaic of filter elements of different colours. Typically, an element of the colour-filter mosaic of a colour is assigned to each electro-optical switching element here.

The light modulation elements according to the invention comprise an electrode structure which generates an electric field having a significant component parallel to the layer of the mesogenic medium. This electrode structure may be designed in the form of interdigital electrodes. It may be designed in the form of combs or ladders. Embodiments in the form of superimposed "H"s and double "T"s or "I"s are also advantageous. The electrode structure is advantageously located on only one side of the mesogenic medium, on use of at least one substrate preferably between this and the mesogenic medium. The electrode structure is preferably located in at least two different planes, both located on one side of the mesogenic modulation medium. This applies in particular if the electrode structure contains superjacent substructures. These sub-structures are advantageously separated from one another by a dielectric layer. If the sub-structures are located on opposite sides of an insulation layer, a layout can be selected which allows the creation of capacitors. This is particularly advantageous in the case of addressing of displays by means of an active matrix. Active-matrix displays of this type use a matrix of driving elements having a nonlinear current/voltage characteristic line which are assigned to the individual light modulation elements, such as, for example, TFTs or MIM ("metal insulator metal") diodes.

The construction of light modulation elements with a mesogenic modulation material in an optically isotropic phase is described in principle in DE 102 172 73.0. The construction of the light modulation elements according to the invention is described briefly here. The switching element contains the modulation medium between the inside surfaces of the substrates. The electrode structure having at least two electrodes, to which different potentials can be applied, is located on the inside surface of one substrate.

The electrodes can consist of transparent material, such as, for example, indium tin oxide (ITO). In this case, it may be advantageous and some-times necessary to cover a part or parts of the light modulation element by means of a black mask. This allows areas in which the electric field is not effective to be masked off and the contrast thus to be improved. However, the electrodes can also consist of non-transparent material, usually of metal, for example of chromium, aluminium, tantalum, copper, silver or gold, preferably of chromium. In this case, the use of a separate black mask may be superfluous.

The electric field used is preferably an inhomogeneous field.

It has been found that the mutual lateral separation of the electrodes to which a different potential can be applied has a considerable influence on the characteristic voltages of the light modulation elements. With decreasing separation, the driving voltage required decreases. However, if the separation becomes smaller, the relative aperture of the light modulation element also becomes smaller and the brightness decreases. The electrodes preferably have a mutual separation which is in the range from 0.5 µm to 100 µm, preferably in the range from 1 µm to 20 µm, particularly preferably in the range from 1 µm to 15 µm, very particularly preferably in the range from 2 µm to 12 µm and most preferably in the range from 2 µm, preferably 3 µm, to 11 µm.

With decreasing electrode separation, the driving voltage drops. At the same time, however, the relative aperture and thus the transmission and, for a given illumination, also the brightness of the display drop. If the aim is to optimise the brightness of the electro-optical display, use is preferably made of an electrode separation which is 8 µm or more, particularly preferably 10 µm or more and very particularly preferably 12 µm or more. If, however, the driving voltage is the principal focus of optimisation, the mutual separation of the electrodes is preferably 19 µm or less, particularly preferably 15 µm or less, very particularly preferably 10 µm or less and especially preferably 9 µm or less.

The width of the electrodes in the direction of the adjacent electrodes to which a different potential can be applied is less critical than the separation of the electrodes in this direction. It has virtually no effect on the characteristic voltages of the light modulation elements. With increasing width of the electrodes, however, the relative aperture of the light modulation element becomes smaller and the brightness decreases, in particular if the electrodes consist of material which is not transparent to light. With decreasing width of the electrodes, by contrast, its electric (ohmic) resistance increases. The electrodes preferably have a width which is in the range from 0.5 µm to 30 µm, preferably in the range from 0.5 µm to 20 µm, particularly preferably in the range from 0.7 µm to 19 µm, very particularly preferably in the range from 1 µm to 9 µm and most preferably in the range from 1.5 µm to 6 µm.

The mesogenic media in accordance with the present invention preferably have a blue phase. However, it is also possible to use media in which the temperature range of the blue phase is so narrow that a transition virtually takes place from the crystalline phase, from the smectic phase or from the nematic phase into the isotropic phase.

The characteristic temperature or clearing point of the mesogenic media which preferably have a blue phase is preferably in the range from −20° C. to 80° C., preferably −30° C. to 80° C., preferably 60° C. or less, particularly preferably in the range from 0° C. to 60° C., preferably in the range from 0° C. to 55° C. and very particularly preferably in the range from 20° C. to 60° C., preferably up to 50° C. In the case of displays having backlighting, the characteristic temperature, in a preferred embodiment the clearing point, is preferably in the range from 10° C. to 70° C. and particularly preferably in the range from 30° C. to 60° C.

The blue phase is preferably stable down to −10° C., particularly preferably down to −0° C. and very particularly preferably down to −40° C.

The optical anisotropy of the medium or of the achiral component (B) of the medium at a temperature of 4° below the characteristic temperature or clearing point of the medium or of component (B) is preferably 0.070 or more, preferably 0.080 or more, particularly preferably 0.090 or more and very particularly preferably 0.100 or more. On use of media having lower optical anisotropy in the light modulation elements according to the invention, a higher driving voltage is necessary than on use of media having higher optical anisotropy. So long as a correspondingly high driving voltage is available, media having an achiral component which have a lower optical anisotropy than 0.070 can also be employed.

In a preferred embodiment, the achiral component (B) of the mesogenic media according to the invention preferably has a birefringence (Δn) of 0.100 or more, particularly preferably of 0.150 or more and very particularly preferably of 0.200 or more in the nematic phase at a temperature of 4 degrees below the clearing point. In this preferred embodiment, the concentration of the chiral component (A) is 20% or less, preferably 10% or less and very particularly preferably 7% or less of the mesogenic medium.

The value of the birefringence of component (B) is as good as unlimited for the application according to the invention. In practical terms, however, it is generally 0.500 or less and usually 0.450 or less. The value of the birefringence of the media according to the invention is measured here in the nematic phase at a temperature of 4° below the clearing point.

If the achiral component of the modulation medium (component (B)) is not nematically stable at this temperature or at least not supercoolable down to this temperature in the nematic phase, the birefringence of a mixture of the medium and nematic mixture ZLI-4792 from Merck KGaA is, as in the case of individual substances and premixes, determined at 20° C. and extrapolated to the value of the pure medium from the change compared with mixture ZLI-4792.10% of the medium and 90% of mixture ZLI-4792 are used. If the solubility of the medium is not sufficient, the concentration is changed to 5%, and if the solubility then is still not sufficient, the host mixture used is nematic mixture MLC-6828 from Merck KGaA, as described in greater detail below, and if necessary the concentration here is also reduced from 10% to 5%. The method of extrapolation of the values from the host mixture is used for all corresponding properties of the media, if these cannot be investigated in the nematic phase at the corresponding temperature.

Component (B) of the mesogenic media in accordance with the present invention preferably has a dipole moment of 4 debyes or more, particularly preferably of 6 debyes or more and particularly preferably of 8 debyes or more.

For the light modulation elements in accordance with the present invention, it is possible to use both mesogenic modulation media whose component (B) has positive dielectric anisotropy ($\Delta \epsilon$) in the mesophase and those whose component (B) has negative dielectric anisotropy in the mesophase. Preference is given to the use of mesogenic modulation media whose component (B) has positive dielectric anisotropy ($\Delta \epsilon$) in the mesoppase.

If component (B) of the mesogenic modulation media has positive dielectric anisotropy, this preferably has a value of 15 or more, particularly preferably 30 or more and very particularly preferably 45 or more, at 1 kHz and a temperature of 4° below the clearing point, preferably in the nematic phase. If component (B) of the medium does not have a nematic phase, or if it is not in the nematic phase at a temperature of 4° below the clearing point, its dielectric anisotropy, like the birefringence, is determined by extrapolation of the values of a corresponding host mixture.

If component (B) of the mesogenic modulation media has negative dielectric anisotropy, this is preferably −5 or less, particularly preferably −7 or less and very particularly preferably −10 or less. For dielectrically negative components (B) or the dielectrically negative constituents of components (B) of the modulation media, nematic mixture ZLI-3086 from Merck KGaA is used, if necessary, as host mixture.

Particular preference is given to modulation media having a component (B) of positive dielectric anisotropy.

The modulation media according to the invention in the light modulation elements according to the invention preferably have a characteristic voltage $V_{10}$ in the range from 5 V to 150 V, preferably 15 V to 110 V, particularly preferably 20 V to 90 V and very particularly preferably 30 V to 80 V, at a temperature of 2 degrees above the characteristic temperature. The characteristic voltages are given in these applications for cells having an electrode width of 10 µm and an electrode separation of 10 µm, unless expressly stated otherwise. The modulation media according to the invention in the light modulation elements according to the invention particularly preferably have a characteristic voltage $V_{10}$ of 105 V or less, preferably of 95 V or less, particularly preferably of 75 V or less and very particularly preferably of 50 V or less, at a temperature of 2 degrees above the characteristic temperature.

In a preferred embodiment of the present invention, the modulation media according to the invention in the light modulation elements according to the invention have a characteristic voltage $V_{10}$ in the range from 2 V, preferably 5 V, to 110 V, particularly preferably 10 V to 90 V and very particularly preferably 10 V to 80 V, at a temperature of 2 degrees above the characteristic temperature.

In a further preferred embodiment of the present invention, the modulation media according to the invention in the light modulation elements according to the invention have a characteristic voltage $V_{10}$ in the range from 2 V to 100 V, preferably 3 V to 50 V, particularly preferably 4 V to 30 V, very particularly preferably 5 V to 20 V and most preferably 5 V or 7 V to 15 V, at a temperature of 2 degrees above the characteristic temperature.

In this application, a characteristic temperature ($T_{char.}$) is defined as follows:
- if the characteristic voltage passes through a minimum as a function of temperature, the temperature of this minimum is referred to as the characteristic temperature,
- if the characteristic voltage does not have a minimum as a function of temperature, but the modulation medium has one or more blue phases, the temperature of the transition into the blue phase, in the case of the occurrence of a plurality of blue phases the temperature of the transition into the blue phase which occurs first with rising temperature, is referred to as the characteristic temperature,
- if the characteristic voltage does not have a minimum as a function of temperature and the modulation medium does not have a blue phase either, the temperature of the transition into the isotropic phase is referred to as the characteristic temperature.

The modulation media according to the invention in the light modulation elements according to the invention preferably have low temperature dependence of the characteristic voltages ($V_X$), for example $V_{10}$, $V_{50}$, $V_{70}$ and $V_{90}$. The temperature dependence ($dV_X/dT$) of the characteristic voltages ($V_X$) is preferably described by their relative values ($dV^*_X/dT$). To this end, it is compared with the respective characteristic voltage at a reference temperature. The reference temperature ($T_{ref.}$) is the temperature 2 degrees above the characteristic temperature of the respective modulation medium.

$$dV^*_X/dT = dV_X(T_{ref.})/dT/V_X(T_{ref.}) \quad (5)$$

in which
- $V_X$: the voltage at which X % relative contrast is achieved,
- T denotes the temperature,
- $T_{ref.}$ denotes the reference temperature $T_{ref.} = T_{char.} + 2°$ (see text) and
- $T_{char.}$ denotes characteristic temperature.

The relative temperature dependence of the characteristic voltages, preferably of $V_{70}$, is preferably quoted over a certain temperature range commencing below to above the desired operating temperature. The operating temperature is preferably in a range from 0.5° to 60°, particularly preferably from 1° to 50° and very particularly preferably from 1° to 30°, above the characteristic temperature of the modulation medium in the cell. For comparison of the temperature dependences of the characteristic voltages, the temperature dependence is quoted in this application over a range from (about) one degree below to (about) one degree above a temperature of two (about) degrees above the characteristic temperature of the modulation medium. The temperature dependence is quoted as the quotient of the difference of the voltage values at the extreme temperatures (end temperatures or limit temperatures) and the difference of these temperatures and is assigned to the mean of these temperatures, unless explicitly stated otherwise.

The amount and preferably the value of the temperature dependence of the characteristic voltages, preferably of $V_{70}$, in this temperature range is preferably in the range from 0%/degree to 30%/degree, preferably in the range from 0%/degree to 23%/degree, preferably up to 22%/degree, preferably up to 20%/degree, particularly preferably in the range from 0%/degree to 15%/degree, preferably up to 12%/degree and very particularly preferably 0%/degree to 7%/degree.

The light modulation elements according to the invention preferably have low temperature dependence over a wide range of operating temperatures.

The said limits for the temperature dependence particularly preferably apply over a temperature range of +/−10 or more around the operating temperature in the range of operating temperatures selected from the range from 2° above the characteristic temperature of the modulation medium to 10° above characteristic temperature, particularly preferably over a temperature range of +/−4° around the temperature of 5° above the characteristic temperature, especially preferably over a temperature range of +/−1° or more around the operating temperature in the range of operating temperatures selected from the range from 2° above the characteristic temperature to 20° above the characteristic temperature, very particularly preferably over a temperature range of +/−4°, preferably +/−9°, around the temperature from 10° above the characteristic temperature.

The modulation media used in the light modulation elements according to the invention preferably have a blue phase which extends over a temperature range having a width of 5 degrees or more, preferably of 10 degrees or more, particularly preferably of 20 degrees or more and very particularly preferably of 30 degrees or more.

In a particularly preferred embodiment of the present invention, the modulation media used in the light modulation elements according to the invention preferably have a blue phase which extends over a temperature range having a width of 15 degrees or more, particularly preferably of 30 degrees or more and very particularly preferably of 40 degrees or more.

The modulation media preferably have an operating temperature range, preferably a blue phase, in the temperature range from 20° C. or below to 35° C. or above, particularly preferably in the temperature range from 10° C. or below to 50° C. or above, especially preferably in the temperature range from 0° C. or below to 60° C. or above, and very particularly preferably in the temperature range from −30° C. or below to 80° C. or above.

The width of the temperature range of the blue phase is determined as follows, unless expressly stated otherwise.

Firstly, the HTP of the individual compounds of the chiral component (A) or of the entire chiral component (A) is determined in the commercially available liquid-crystal mixture MLC-6828 from Merck KGaA.

For general checking of the occurrence of a blue phase, a mixture of the chiral component (A) in the achiral liquid-crystal mixture AM-3 (specially developed for this purpose) is then prepared. The composition and properties of this mixture are indicated in Example 4. The concentration of component (A) in the achiral mixture is selected here so that the cholesteric pitch of the resultant mixture is in the range 180 nm to 800 nm, preferably in the range 400 nm to 600 nm and particularly preferably 550 nm. One drop of the mixture obtained in this way is covered with a glass cover slip on a specimen slide and examined under the microscope. At a layer thickness of about 100 µm or more, the blue phase can be observed directly (in this respect, see also Gray and Goodby).

Next, the mixture of the modulation medium to be investigated can then be prepared. To this end, the chiral component (A) is dissolved in the desired concentration in the achiral component (B). As an alternative to the above-described method for determination of the position and width of the blue phase, the starting point can also be the mixture of components (A) and (B). To this end, the cholesteric pitch can, if desired, be increased until the blue phase can be observed under the microscope. The three following possibilities are available for this purpose, and are indicated in the sequence of preference:

firstly, the concentration of component (A) is reduced, for example by addition of component (B), until the value of the cholesteric pitch, which is indicated above in connection with the method using reference mixture AM-3, is achieved;

secondly, the compensation of the HTP of component (A) is through the use of one or more chiral compounds having the opposite sign of the HTP to that of component (A) until the desired pitch has been achieved, and thirdly, use of the enantiomers corresponding to the compound or compounds of component (A) for compensation of the HTP of component (A) in the concentration which results in the desired pitch being achieved.

The mixture of component (A) and (B) is introduced, as modulation medium, into a cell having a layer thickness of 20 µm or less, preferably about 10 µm, and investigated with respect to its electro-optical properties.

The phase behaviour of the modulation medium is then investigated in the electro-optical test cell. To this end, the temperature dependence of the characteristic voltages, preferably of $V_{10}$, of the modulation medium is investigated in the reference cell in accordance with the present invention. The occurrence of the blue phase in the light modulation element is evident from the onset of optical isotropy with increasing temperature. The electro-optical effect occurs at the conversion temperature, at which the conversion into an optically isotropic phase takes place, in a similar manner to that described in DE 102 17 273.0. However, the media in accordance with the present invention are then in the blue phase and not in the isotropic phase, like the media described in DE 102 17 273.0. The electro-optical effect in the light modulation elements according to the invention is characterised as follows. The cells are (completely) dark with crossed polarisers. This applies in particular if the cholesteric pitch is much smaller than the wavelength of the light used. The contrast of the electro-optical effect according to the invention has as good as no viewing-angle dependence, and the effect exhibits no bistability.

With further increasing temperature, the characteristic voltages generally increase slightly with increasing temperature. This effect can be observed over the entire range of the blue phase. Even after the conversion temperature from the blue phase into the isotropic phase has been exceeded, the electro-optical effect can be observed. The operating temperature range of the light modulation elements according to the invention is thus generally larger than the range in which the blue phase occurs in the modulation media. At temperatures above the phase transition from the blue phase into the isotropic phase, however, the gradient of the increase in the characteristic voltages with temperature is significantly greater than in the blue phase. The transition temperature from the blue phase into the isotropic phase can be obtained by interpolation from the respective (often virtually linear) curves of the characteristic voltages with temperature below or above this transition temperature.

The temperature range over which the blue phase occurs in the modulation medium can also be confirmed by DSC (differential scanning calorimetry).

In modulation media in which the characteristic voltage of the electro-optical effect in the cells according to the invention passes through a minimum, no differentiation of two regions with a different slope of the temperature curve (initially flat, then steeper) can generally be observed. In these cases, the width of the blue phase is defined as follows in the present application. The temperature of the upper end of the phase range is defined as the temperature at which the characteristic voltage adopts twice the value of the minimum of the characteristic voltage. The temperature of the lower end of the phase range is defined as the temperature at which the characteristic voltage likewise adopts twice the value of the minimum of the characteristic voltage. However, if this value is not achieved at temperatures below the temperature of the minimum, the temperature at which the electro-optical effect occurs first with increasing temperature is defined as the temperature of the lower end of the phase range.

The electro-optical effect in the case of observation at the preferred viewing angle, preferably over a viewing-angle range which extends horizontally and vertically up to 30° or more, preferably up to 40° or more, particularly preferably up to 45° or more and very particularly up to 60° or more, preferably exhibits a contrast ratio of 5:1 or more, preferably of 10:1 or more and very particularly preferably of 15:1 or more.

The electro-optical effect preferably exhibits a response time of 15 ms or less, preferably of 10 ms or less, particularly preferably of 5 ms or less and very particularly preferably of 3 ms or less. The response times, as throughout the present application, are determined under the following conditions, unless explicitly stated otherwise. When determining the switch-on time ($\tau_{on}$), the value of the rectangular voltage is increased from $V_0$ to $V_{100}$ of the switching element, and the time taken for the change in the transmission or relative contrast from 10% to 90% is determined. The switch-off time ($\tau_{off}$) is quoted for switching from 90% to 10% relative contrast while reducing the voltage from $V_{100}$ to $V_0$.

If the clearing point of the modulation medium in the cell differs from that in bulk, the characteristic voltages at which modulation media do not have a blue phase and at which the characteristic voltages also do not pass through a minimum, the temperature is based on the clearing point in the cell.

In the case where the mesogenic modulation medium does not have a sharp clearing point in the case of determination in a capillary in the clearing-point measuring instrument (Mettler), but instead has a relatively broad clearing range, which is typically a few degrees broad, the clearing point here, in contrast to the usual definition, is not defined as the beginning of clearing, but instead the end of the clearing range.

The mesogenic media in accordance with the present invention preferably consist of two to 40 compounds, particularly preferably five to 30 compounds and very particularly preferably seven to 25 compounds.

The chiral compounds of chiral component (A) preferably have a high HTP. They are also referred to as chiral dopants since they are generally added in relatively low concentrations to mesogenic base mixtures. They preferably have good solubility in the achiral component (B). They do not impair the mesogenic or liquid-crystalline properties of the mesogenic medium, or only do so to a small extent, so long as the cholesteric pitch has small values which are much smaller than the wavelength of the light. If the cholesteric pitch is in the order of the wavelength of the light, however, they induce a blue phase having a completely different structure from that of the cholesteric phase. If two or more chiral compounds are employed, they may have the same or opposite direction of rotation and the same or opposite temperature dependence of the twist.

Particular preference is given to chiral compounds having an HTP of 20 µm$^{-1}$ or more, in particular of 40 µm$^{-1}$ or more, particularly preferably of 70 µm$^{-1}$ or more, in the commercial liquid-crystal mixture MLC-6828 from Merck KGaA.

In a preferred embodiment of the present invention, the chiral component (A) consists of two or more chiral compounds which all have the same sign of the HTP.

The temperature dependence of the HTP of the individual compounds may be high or low. The temperature dependence of the pitch of the medium can be compensated by mixing compounds having different temperature dependence of the HTP in corresponding ratios.

example, gluconic acid, gulonic acid, ketogulonic acid; chiral substituted glycol radicals, such as, for example, mono- or oligoethylene or propylene glycols, in which one or more CH$_2$ groups are substituted by alkyl or alkoxy; amino acids, such as, for example, alanine, valine, phenylglycine or phenylalanine, or sequences of 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820.

Particular preference is given to dopants selected from the group consisting of compounds of the following formulae A-I to A-III

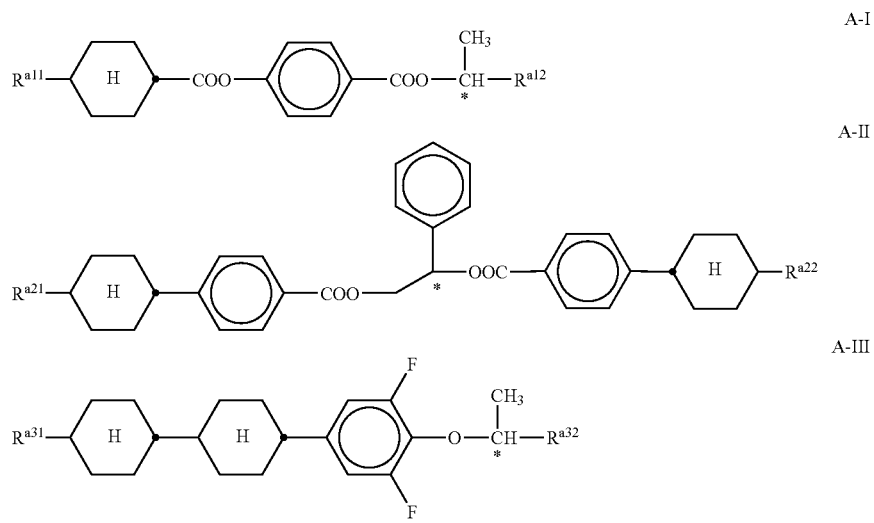

For the optically active component, a multiplicity of chiral dopants, some of which are commercially available, are available to the person skilled in the art, such as, for example, cholesteryl nonanoate, R/S-811, R/S-1011, R/S-2011, R/S-3011, R/S-4011, B(OC)2C*H—C-3 or CB15 (all Merck KGaA, Darmstadt).

Particularly suitable dopants are compounds which contain one or more chiral radicals and one or more mesogenic groups, or one or more aromatic or alicyclic groups which form a mesogenic group with the chiral radical.

Suitable chiral radicals are, for example, chiral branched hydrocarbon radicals, chiral ethanediols, binaphthols or dioxolanes, furthermore mono- or polyvalent chiral radicals selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral radicals are sugar derivatives, such as glucose, mannose, galactose, fructose, arabinose, dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide, isosorbide), dianhydromannitol (isosorbitol) or dianhydroiditol (isoiditol); sugar acids, such as, for in which $R^{a11}$ and $R^{a12}$ independently of one another, denote alkyl, oxaalkyl or alkenyl having 2 to 9, preferably up to 7, C atoms, and $R^{a11}$ alternatively denotes methyl or alkoxy having 1 to 9 C atoms, preferably both denote alkyl, preferably n-alkyl, $R^{a21}$ and $R^{a22}$, independently of one another, denote alkyl or alkoxy having 1 to 9, preferably up to 7, C atoms, oxaalkyl, alkenyl or alkenyloxy having 2 to 9, preferably up to 7, C atoms, preferably both denote alkyl, preferably n-alkyl, $R^{a31}$ and $R^{a32}$, independently of one another, denote alkyl, oxaalkyl or alkenyl having 2 to 9, preferably up to 7, C atoms, and $R^{a11}$ denotes alternatively methyl or alkoxy having 1 to 9 C atoms, preferably both denote alkyl, preferably n-alkyl, Particular preference is given to dopants selected from the group consisting of compounds of the following formulae

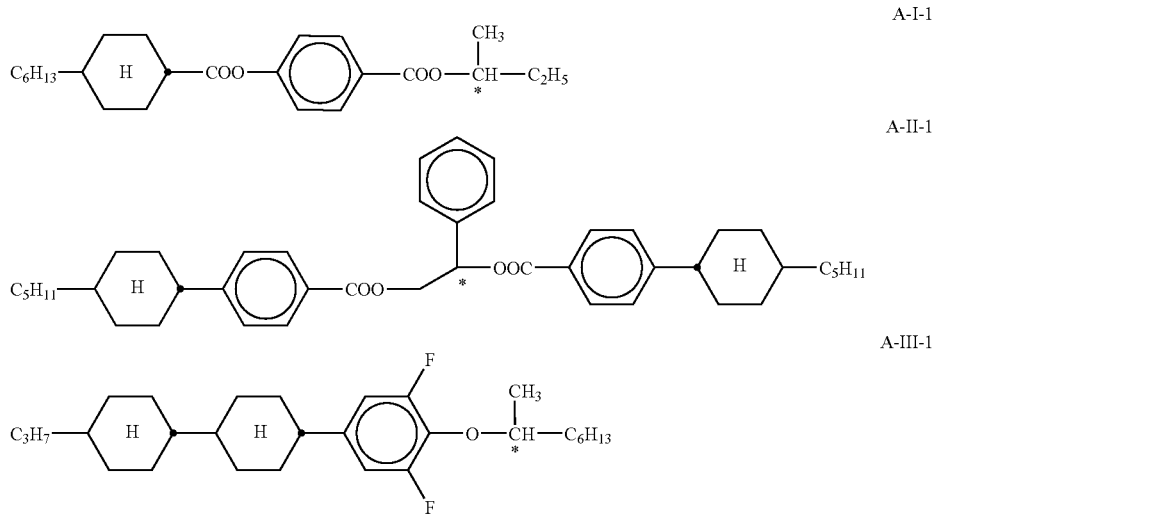

A-I-1

A-II-1

A-III-1

Further preferred dopants are derivatives of the isosorbide, isomannitol or isoiditol of the following formula A-IV

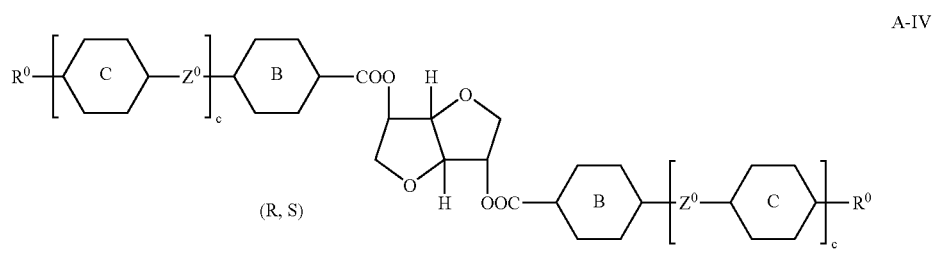

A-IV in which the group

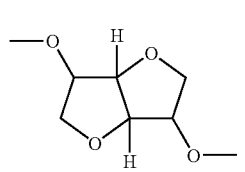

(dianhydrosorbitol),

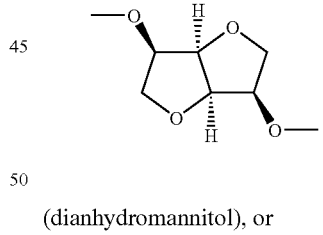

(dianhydromannitol), or

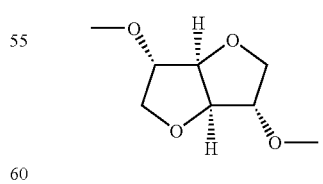

(dianhydroiditol), preferably dianhydrosorbitol, and chiral ethanediols, such as, for example, diphenylethanediol (hydrobenzoin), in particular mesogenic hydrobenzoin derivatives of the following formula A-V denotes

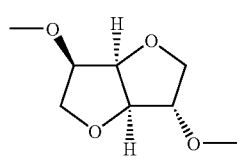

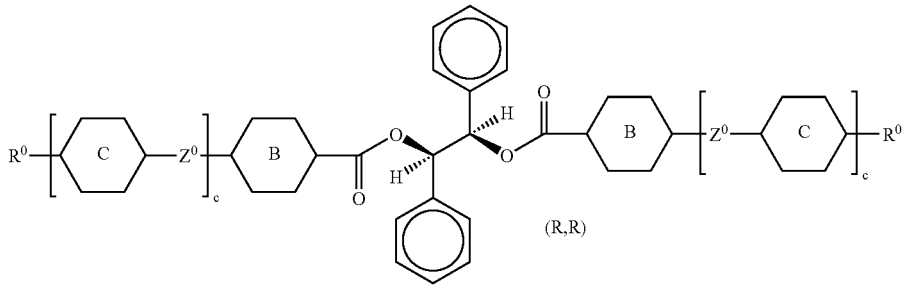

A-V including the (R,S), (S,R), (R,R) and (S,S) enantiomers, none of which are shown, in which B and C each, independently of one another, denote 1,4-phenylene, which may also be mono-, di- or trisubstituted by L, or 1,4-cyclohexylene, L denotes H, F, Cl, CN or optionally halogenated alkyl, alkoxy, alkylcarbonyl, alkoxycarbonyl or alkoxycarbonyloxy having 1-7 C atoms, c denotes 0 or 1, $Z^0$ denotes —COO—, —OCO—, —CH$_2$CH$_2$— or a single bond, and $R^0$ denotes alkyl, alkoxy, alkylcarbonyl, alkoxycarbonyl or alkylcarbonyloxy having 1-12 C atoms.

The compounds of the formula A-IV are described in WO 98/00 428. The compounds of the formula A-V are described in GB-A-2,328,207.

Very particularly preferred dopants are chiral binaphthyl derivatives, as described in WO 02/94 805, chiral binaphthol acetal derivatives, as described in WO 02/34 739, chiral TADDOL derivatives, as described in WO 02/06 265, and chiral dopants containing at least one fluorinated bridging group and a terminal or central chiral group, as described in WO 02/06 196 and WO 02/06 195.

Particular preference is given to chiral compounds of the formula A-VI

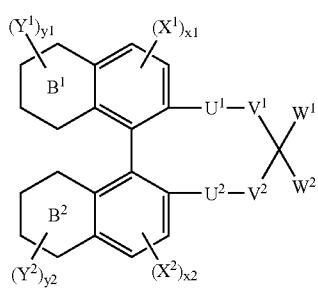

A-VI in which $X^1$, $X^2$, $Y^1$ and $Y^2$ each, independently of one another, denote F, Cl, Br, I, CN, SCN, SF$_5$, straight-chain or branched alkyl having 1 to 25 C atoms, which may be monosubstituted or polysubstituted by F, Cl, Br, I or CN and in which, in addition, one or more non-adjacent CH$_2$ groups may each, independently of one another, be replaced by —O—, —S—, —NH—, NR$^0$, —CO—, —COO—, —OCO—, —OCOO—, —S—CO—, —CO—S—, —CH=CH— or —C≡C— in such a way that O and/or S atoms are not bonded directly to one another, a polymerisable group or cycloalkyl or aryl having up to 20 C atoms, which may optionally be monosubstituted or polysubstituted by halogen, preferably F, or by a polymerisable group, $R^0$ denotes H or alkyl having 1 to 4 C atoms, $x^1$ and $x^2$ each, independently of one another, denote 0, 1 or 2, $y^1$ and $y^2$ each, independently of one another, denote 0, 1, 2, 3 or 4, $B^1$ and $B^2$ each, independently of one another, denote an aromatic or partially or fully saturated aliphatic six-membered ring in which one or more CH groups by N atoms and one or more non-adjacent CH$_2$ groups by O and/or S, $W^1$ and $W^2$ each, independently of one another, denote -$Z^1$-$A^1$-($Z^2$-$A^2$)$_m$-R, and one of the two alternatively denotes $R^1$ or $A^3$, but both do not simultaneously denote H, or

denotes

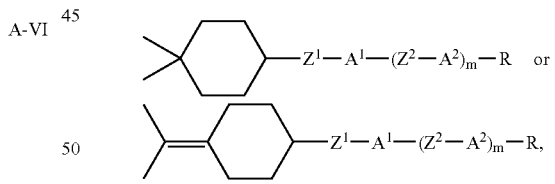

$U^1$ and $U^2$ each, independently of one another, denote CH$_2$, O, S, CO or CS, $V^1$ and $V^2$ each, independently of one another, denote (CH$_2$)$_n$— in which one to four non-adjacent CH$_2$ groups may be replaced by O and/or S, and one of $V^1$ and $V^2$ and, in the case where

denotes

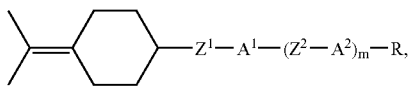

both denote a single bond, $Z^1$ and $Z^2$ each, independently of one another, denote —O—, —S—, —CO—, —COO—, —OCO—, —O—COO—, —CO—NR$^0$—, —NR$^0$—CO—, —O—CH$_2$—, —CH$_2$—O—, —S—CH$_2$—, —CH$_2$—S—, —CF$_2$—O—, —O—CF$_2$—, —CF$_2$—S—, —S—CF$_2$—, —CH$_2$—CH$_2$—, —CF$_2$—CH$_2$—, —CH$_2$—CF$_2$—, —CF$_2$—CF$_2$—, —CH=N—, —N=CH—, —N=N—, —CH=CH—, —CF=CH—, —CH=CF—, —CF=CF—, —C≡C—, a combination of two of these groups, where no two O and/or S and/or N atoms are bonded directly to one another, preferably —CH=CH—COO—, or —COO—CH=CH—, or a single bond, $A^1$, $A^2$ and $A^3$ each, independently of one another, denote 1,4-phenylene, in which one or two non-adjacent CH groups may be replaced by N, 1,4-cyclohexylene, in which one or two non-adjacent CH$_2$ groups may be replaced by O and/or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups may be monosubstituted or polysubstituted by L, and in addition $A^1$ denotes a single bond, L denotes a halogen atom, preferably F, CN, NO$_2$, alkyl, alkoxy, alkylcarbonyl, alkoxycarbonyl or alkoxycarbonyloxy having 1-7 C atoms, in which one or more H atoms may be replaced by F or Cl, m in each case, independently, denotes 0, 1, 2 or 3, and R and $R^1$ each, independently of one another, denote H, F, Cl, Br, I, CN, SCN, SF$_5$, straight-chain or branched alkyl having 1 or 3 to 25 C atoms respectively, which may optionally be monosubstituted or polysubstituted by F, Cl, Br, I or CN, and in which one or more non-adjacent CH$_2$ groups may be replaced by —O—, —S—, —NH—, —NR$^0$—, —CO—, —COO—, —OCO—, —O—COO—, —S—CO—, —CO—S—, —CH=CH— or —C≡C—, where no two O and/or S atoms are bonded directly to one another, or a polymerisable group.

Particular preference is given to chiral binaphthyl derivatives of the formula A-VI-1

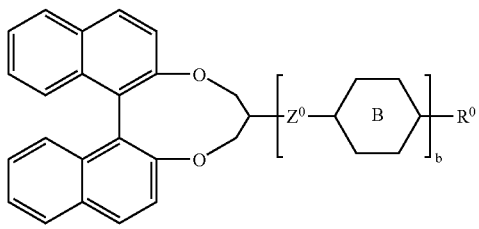

A-VI-1 in particular those selected from the following formulae A-VI-1a to A-VI-1c

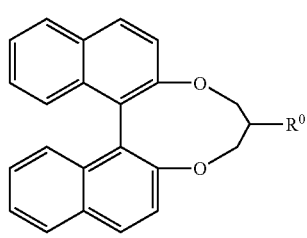

A-VI-1a

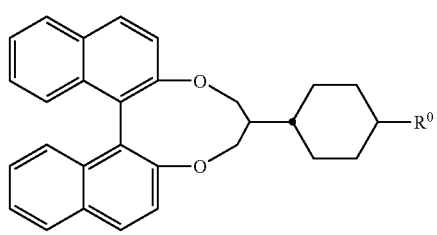

A-VI-1b

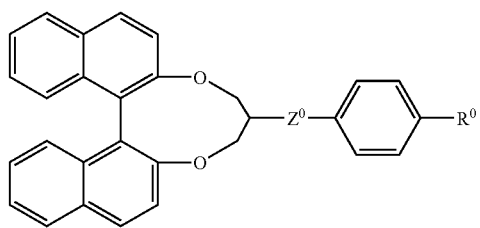

A-VI-1c in which B, $R^0$ and $Z^0$ are as defined for the formula A-IV, and b is 0, 1 or 2, and $Z^0$ denotes, in particular, —OCO— or a single bond.

Particular preference is furthermore given to chiral binaphthyl derivatives of the formula A-VI-2

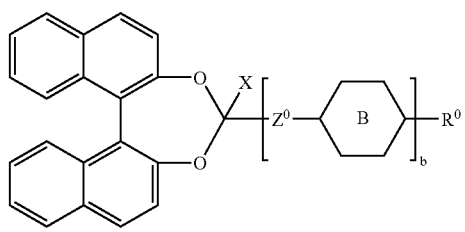

A-VI-2 in particular those selected from the following formulae A-VI-2a to A-VI-2f

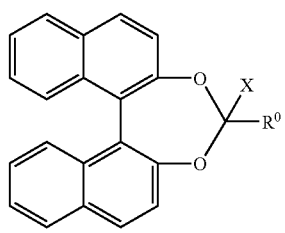

A-VI-2a

-continued

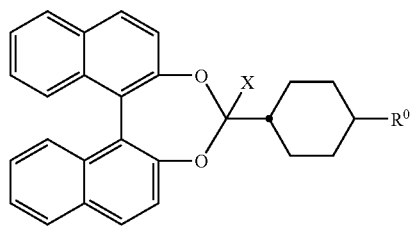
A-VI-2b

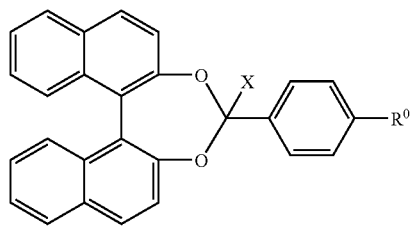
A-VI-2c

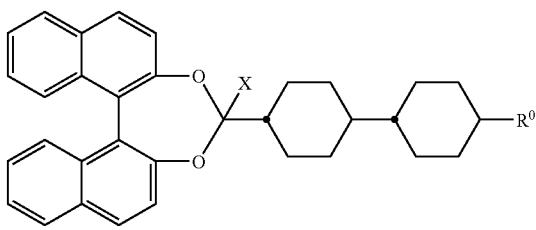
A-VI-2d

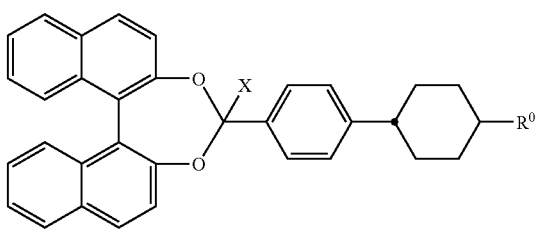
A-VI-2e

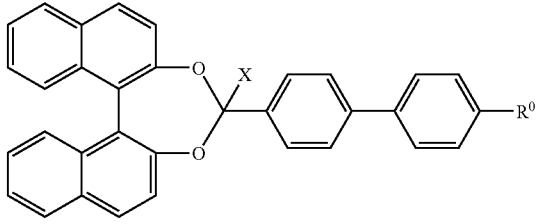
A-VI-2f in which $R^0$ is as defined for the formula A-IV, X denotes H, F Cl, CN or $R^0$, preferably F.

In particular, the dopants of the above-mentioned formulae A-IV, A-V and A-VI, in particular A-VI-1a to A-VI-1c and A-VI-2a to A-VI-2d, exhibit good solubility in the achiral component and induce a cholesteric structure having high twist and low temperature dependence of the helical pitch. Thus, even on use of only one of these dopants in small amounts, media according to the invention having favourable properties can be obtained which are suitable, in particular, for use in light modulation elements in which the modulation medium is addressed in the optically isotropic phase.

The achiral component (B) of the mesogenic media according to the invention having positive dielectric anisotropy in accordance with the present invention preferably comprises
- a component (B-A) consisting of one or more compounds having a very strongly positive dielectric anisotropy of 30 or more,
- optionally a component (B-B) consisting of one or more compounds having a strongly positive dielectric anisotropy of 10 to <30,
- optionally a component (B-C) consisting of one or more compounds having a moderately positive dielectric anisotropy of >1.5 to <10,
- optionally a component (B-D) consisting of one or more dielectrically neutral compounds having a dielectric anisotropy in the range −1.5 to +1.5, and
- optionally a component (B-E) consisting of one or more compounds having a negative dielectric anisotropy of less than −1.5.

Component (B-A) of component (B) of these media preferably comprises one or more compounds of the formula I and particularly preferably consists predominantly and very particularly preferably consists virtually completely of one or more compounds selected from the compounds of the formulae I and II

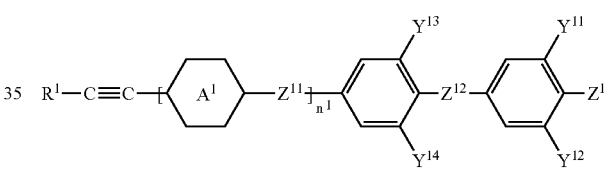

in which
$R^1$ denotes alkyl having 1 to 7 C atoms or oxaalkyl having 2 to 7 C atoms, each preferably having 2 to 5 C atoms, preferably alkyl,

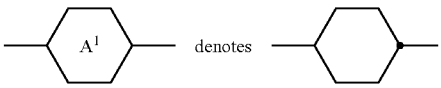

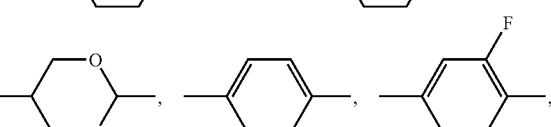

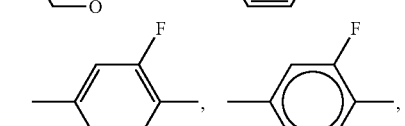

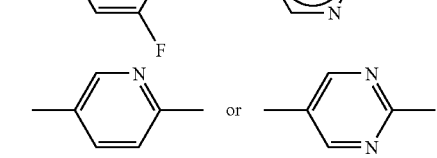

$Z^{11}$ and $Z^{12}$ each, independently of one another, denote a single bond, —CO—O—, trans —CH═CH—, —CH=CF—, —CF=CH—, —CF=CF—, —CH=CH—CO—O—, —CF=CF—CO—O—, —CF=CH—CO—O—, —CH=CF—CO—O—, —CF$_2$—O—, —O—CF$_2$— or —C≡C— or a combination of two or more of these groups, preferably at least one of these groups is —COO— or —CF$_2$—O—, X$^1$ denotes F, —OCF$_3$, —CF$_3$, —OCF$_2$H, Cl, CN, —C≡C—CN or NCS, preferably CN, —CF$_3$, —C≡C—CN or NCS, particularly preferably CN or —CF$_3$, Y$^{11}$, Y$^{12}$, Y$^{13}$ and Y$^{14}$ denote H or F, and n$^1$ denotes 0 or 1, preferably 0, where the compounds of the formula I preferably carry three or more, particularly preferably four or more, fluorine atoms on the phenyl rings, but preferably not more than two F atoms per phenyl ring, Y$^{11}$, Y$^{12}$ and Y$^{13}$ particularly preferably being F and Z$^{12}$ preferably being —COO—,

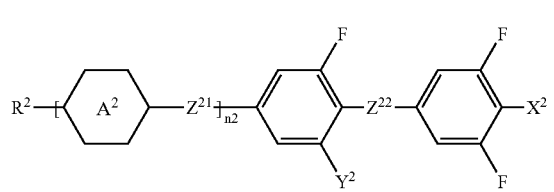

II in which

R$^2$ denotes alkyl or alkoxy having 1 to 7 C atoms, alkenyl, alkenyloxy or oxaalkyl having 2 to 7 C atoms, preferably alkyl or alkoxy having 1 to 5 C atoms or alkenyl having 2 to 5 C atoms, preferably alkyl or alkoxy,

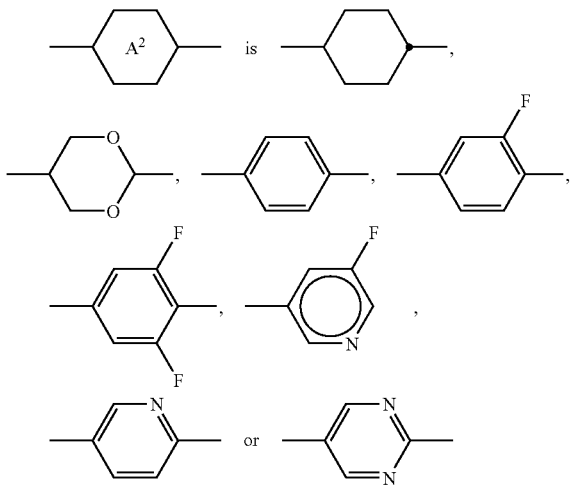

Z$^{21}$ and Z$^{22}$ each, independently of one another, denote a single bond, —CO—O—, trans —CH=CH—, —CH=CF—, —CF=CH—, —CF=CF—, —CH=CH—CO—O—, —CF=CF—CO—O—, —CF=CH—CO—O—, —CH=CF—CO—O—, —CF$_2$—O—, —O—CF$_2$— or —C≡C— or a combination of two or more of these groups, preferably at least one of these groups is —COO— or —CF$_2$—O—, X$^2$ denotes F, —OCF$_3$, —CF$_3$, —OCF$_2$H, Cl, CN, —C≡C—CN or NCS, preferably CN, —CF$_3$, —C≡C—CN or NCS, particularly preferably CN, Y$^2$ denotes H or F, and n$^2$ denotes 0 or 1.

In a preferred embodiment of the present application, component (B) of the media comprises one or more compounds of the formula I and preferably consist predominantly and particularly preferably consist virtually completely of one or more compounds of the formula I The compounds of the formula I are preferably selected from the group consisting of the compounds I-1 and I-2

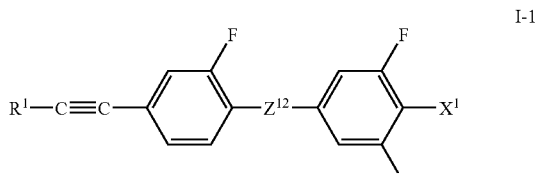

I-1

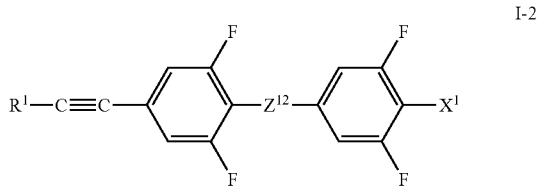

I-2 in which the parameters are as defined above under the formula I and preferably

R$^1$ denotes alkyl having 1 to 7, preferably having 1 to 5, preferably up to 3, C atoms, Z$^{12}$ denotes —COO— or —CF$_2$—O—, and X$^1$ denotes CN, —CF$_3$ or NCS, preferably CN or —CF$_3$.

The media according to the invention particularly preferably comprise one or more compounds of the formula I, preferably of the formula I-1 and/or of the formula I-2, in which X$^1$ is CF$_3$.

The compounds of the formula II are preferably selected from the group consisting of the compounds II-1 to II-7

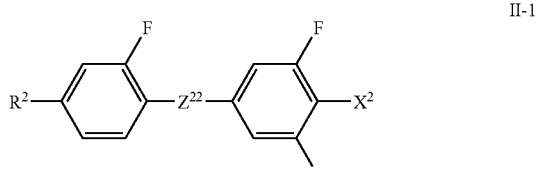

II-1

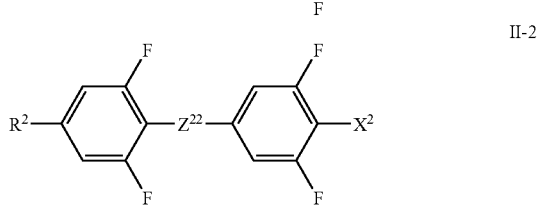

II-2

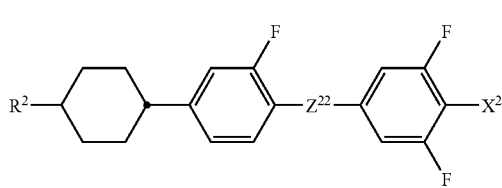

II-3

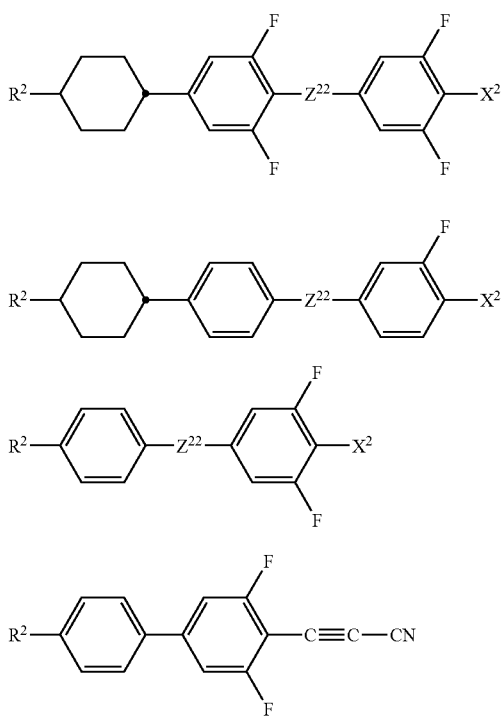

in which the parameters are as defined above under the formula II and preferably $R^2$ denotes alkyl or alkoxy having 1 to 7 C atoms, alkenyl, alkenyloxy or oxaalkyl having 2 to 7 C atoms, preferably alkyl or alkoxy having 1 to 5 C atoms, $Z^{22}$ denotes a single bond, —CO—O— or —CF$_2$—O—, preferably —COO— or —CF$_2$—O—, in the formula II-6 also particularly preferably —C≡C—, and $X^2$ denotes CN or CF$_3$, preferably CF$_3$, in the formula II-6 particularly preferably CN or CF$_3$, preferably CN.

The media according to the invention preferably comprise one or more compounds selected from the group consisting of the compounds of the formulae II1 to II-5, preferably compounds in which $Z^{22}$ denotes —CO—O— or —CF$_2$—O—.

In a preferred embodiment of the present invention, component (B-A) of component (B) of the media according to the invention preferably comprises one or more compounds of the formula II and particularly preferably consists predominantly and very particularly preferably consists virtually completely of one or more compounds of the formula II.

For the light modulation elements in accordance with the present invention, it is possible to use both mesogenic modulation media which have positive dielectric anisotropy (Δε) in the mesophase and those which have negative dielectric anisotropy. Preference is given to the use of mesogenic modulation media which have positive dielectric anisotropy (Δε) in the mesophase. If the mesogenic modulation media have positive dielectric anisotropy, the achiral component (B) of these media preferably has a value of Δε of 40 or more, particularly preferably of 50 or more and very particularly of 60 or more, at 1 kHz and a temperature of 4° below the clearing point, preferably in the nematic phase.

Component (B) of the mesogenic media in accordance with the present invention having positive dielectric anisotropy particularly preferably consist predominantly and very particularly preferably consist virtually completely of component (B-A).

In a preferred embodiment, component (B) of the mesogenic media in accordance with the present invention having positive dielectric anisotropy comprises one or more components selected from the group consisting of components (B-B) to (B-D), preferably selected from the group consisting of components (B-B) and (B-D), particularly preferably of component (B-B).

Component (B) of the mesogenic media in accordance with the present invention having positive dielectric anisotropy preferably comprises 5% to 80%, preferably 10% to 60%, particularly preferably 18% to 43% of one or more compounds of the formula I,
  5% to 95%, preferably 15% to 80%, particularly preferably 40% to 70% of one or more compounds of the formula II and
  0% to 30% preferably 0% to 15%, particularly preferably 0% to 10% of one or more further compounds.

Component (B) of the mesogenic media in accordance with the present invention having positive dielectric anisotropy preferably comprises 3% to 45%, preferably 5% to 40%, particularly preferably 10% to 35% of one or more compounds of the formula I-1 and/or
  2% to 35%, preferably 4% to 30%, particularly preferably 5% to 30% of one or more compounds of the formula I-1 and/or
  0 to 30%, preferably 2% to 25%, particularly preferably 5% to 20% of one or more-compounds of the formula II-1 and/or
  0 to 30%, preferably 2% to 25%, particularly preferably 5% to 20% of one or more compounds of the formula II-2 and/or
  5% to 70%, preferably 15% to 65%, particularly preferably 20% to 60% of one or more compounds of the formula II-3 and/or II-4, preferably II-4 and/or
  0% to 20% preferably 0% to 15%, particularly preferably 3% to 12% of one or more compounds of the formula II-5 and/or
  0% to 30% preferably 0% to 20%, particularly preferably 3% to 15% of one or more compounds of the formula II-6 and/or
  0% to 35% preferably 0% to 30%, particularly preferably 3% to 12% of one or more compounds of the formula II-7.

Component (B) of the mesogenic media in accordance with the present invention having negative dielectric anisotropy particularly preferably consist predominantly and very particularly preferably consist virtually completely of component (B-E).

Component (B-E) of these media preferably comprises one or more compounds.

The mesogenic media having negative dielectric anisotropy in accordance with the present invention preferably comprise a component (B-A') consisting of one or more compounds having a strongly negative dielectric anisotropy of −5 or less,
  optionally a component (B-B') consisting of one or more compounds having a moderately negative dielectric anisotropy of −1.5 to <−5,
  optionally a component (B-C') consisting of one or more dielectrically neutral compounds having a dielectric anisotropy of −1.5 to +1.5, and optionally a component (B-D') consisting of one or more compounds having a positive dielectric anisotropy of greater than 1.5.

The mesogenic media in accordance with the present application preferably comprise four or more, preferably six or more, compounds selected from the group consisting of the compounds of components (A) and (B) and/or five or more compounds of the compounds of component (B) and/or one, two or more compounds of the compounds of component (A).

The mesogenic medium in accordance with the present invention may comprise further additives, for example stabilisers or dichroic dyes, in conventional concentrations. The total concentration of these further constituents is in the range from 0% to 10%, preferably in the range from 0.1% to 6%, based on the mixture as a whole. The concentrations of the individual compounds of these are preferably in the range from 0.1 to 3%. The concentration of these compounds and similar constituents of the mixture are not taken into account when indicating the concentration ranges of the remaining mixture constituents, unless expressly stated otherwise.

The media are obtained from the compounds in a conventional manner. The compounds employed in lesser amount are advantageously dissolved in the compounds employed in greater amount. If the temperature during the mixing process is increased above the clearing point of the predominant component, the completeness of the dissolution can easily be observed. However, the media according to the invention can also be prepared in different ways, for example through the use of premixes. Premixes which can be employed are, inter alia, homologue mixtures and/or eutectic mixtures. However, the premixes may also be media which are already usable themselves. This is the case in so-called two-bottle or multi-bottle systems.

In the present application, the following applies, unless explicitly stated otherwise.

The stated ranges of values preferably include the limit values.

The concentrations are given in % by weight and are based on the complete mixture. Temperatures are indicated in degrees Celsius and temperature differences in differential degrees Celsius. All physical properties were determined as in "Merck Liquid Crystals, Physical Properties of Liquid Crystals", as of November 1997, Merck KGaA, Germany, and are given for a temperature of 20° C., unless explicitly stated otherwise. The optical anisotropy ($\Delta n$), also known as the birefringence, is determined at a wavelength of 589.3 nm. The dielectric properties are determined at a frequency of 1 kHz. The properties of the mesogenic modulation media and in particular those of their achiral components (B) are determined at a temperature of 4° below their respective clearing point.

The cholesteric pitch of cholesteric media or chiral nematic media is determined by known methods depending on its magnitude.

In the case of relatively large values, it is determined by the Grandjean-Cano method. To this end, the material is introduced into a thermostatted, wedge-shaped cell with homogeneous alignment at the substrates. The separations of the disclination lines observed are determined, and the pitch is calculated via the wedge angle. The wedge angle used depends on the pitch to be determined. Cells having a wedge angle of from about 0.1° to 4°, preferably 0.5° to 3° and particularly preferably 0.1° to 2°, are typically used. The separations of the disclination lines are preferably measured under the microscope. Alignment defects are taken into account by corresponding averaging of the values. Alternatively, the average of the separations can be determined by diffraction of a laser beam (for example an He—Ne laser) at the grid of the disclination lines. The diffraction maxima here are advantageously determined by means of a diode array or CCD. The angle of the wedge cell is preferably determined by multiple reflection of a laser beam. Alternatively, it can be obtained from the geometry of the cell or obtained by calibration measurement using a material of known pitch. The measurement accuracy for the pitch is from about +/−1% to about +/−3%, depending on the measurement method and current value.

If the values of the pitch are too large, the lens method is used. In this, the material is aligned between a planar plate and a convex lens. The separations of the circular disclination lines are then measured. This can be carried out using an image processing system, which simplifies averaging of the data. The separation of the lens surface from the planar substrate at the location of the disclination lines is obtained from the radius of the lens and the separation of the disclination line from the contact point. The measurement accuracy of this method is somewhat less than in the method using wedge cells, but is able to cover a large range of pitch values.

Very small values of the pitch are determined using the method of selective reflection. To this end, the transmission through an aligned sample of the material is determined. The pitch is obtained from the wavelength of the maximum of the selective reflection via the refractive index of the material. In this method, the measurement accuracy for the pitch is likewise about +/−1%.

The HTP of the chiral materials, in particular of the chiral individual compounds, is determined in accordance with the present application at a temperature of 20° C. in the commercial, nematic host mixture MLC-6828 from Merck KGaA, Darmstadt, by the Grandjean-Cano method. The temperature dependence of the HTP is investigated in the range from 0° C. to 50° C. and typically quoted at 20° C. In general, the HTP is also determined in the commercial, nematic host mixture MLC-6260, likewise from Merck KGaA.

If the cholesteric pitch of a modulation medium cannot be determined, it is extrapolated from the HTP of component (A) in component (B). If the value of the HTP of component (A) in component (B) also cannot be determined at the corresponding temperature, this is also extrapolated, in this case from the temperature dependence of the HTP, generally at lower temperatures.

In connection with details on the composition of the media or their components,

"comprise" means that the concentration of the said material in each case, i.e. of the component or of the compound, in the reference unit, i.e. the medium or the component, is preferably 10% or more, particularly preferably 20% or more and very particularly preferably 30% or more, "consist predominantly of" means that the concentration of the said material in the reference unit is preferably 50% or more, particularly preferably 60% or more and very particularly preferably 70% or more, and "consist virtually completely of" means that the concentration of the said material in the reference unit is preferably 80% or more, particularly preferably 90% or more and very particularly preferably 95% or more.

Dielectrically positive-compounds have a $\Delta \epsilon$ of >1.5, dielectrically neutral compounds have a $\Delta \epsilon$ in the range $-1.5 \leq \Delta\epsilon \leq 1.5$ and dielectrically negative compounds have a $\Delta\epsilon$ of $<-1.5$. The same definitions also apply to components of mixtures and to mixtures.

The dielectric properties, electro-optical properties (for example the threshold voltages) and the response times were determined in test cells produced at Merck KGaA, Darmstadt, Germany. The test cells for the determination of $\Delta\epsilon$ had a layer thickness of 22 µm and a circular electrode of indium tin oxide (ITO) having an area of 1.13 cm² and a protective ring. For homeotropic alignment for the determination of $\epsilon_\parallel$, cells having a homeotropically aligning polyimide alignment layer were used. Alternatively, lecithin (Merck KGaA) can be used as alignment agent. The cells for the determination of $\epsilon_\perp$ had alignment layers of the polyimide AL-1054 from Japan Synthetic Rubber, Japan. The capacitances were generally measured using a Solatron 1260 frequency analyser with a rectangular wave and an effective voltage of 0.3 $V_{rms}$. In the case of materials having high dielectric anisotropy in which realignment of the liquid-crystal director already takes place at a voltage of 0.3 $V_{rms}$, a lower voltage of 0.1 $V_{rms}$ is exceptionally used. The electro-optical investigations were carried out with white light. The characteristic voltages were determined with perpendicular observation.

The dielectric properties of the materials are preferably determined at a frequency of 1 kHz and, if possible, at 20° C., and at a temperature of 4° below the transition temperature into the optically isotropic phase (blue phase or isotropic phase) that occurs first with rising temperature, and at a temperature of 4° above the clearing point or the characteristic temperature of the particular material.

The dielectric anisotropy ($\Delta\epsilon$) of the compounds is determined by extrapolation of the values of a 10% solution of the respective compound in a host mixture at 20° C. to a proportion of the respective compound of 100%. The capacitances of the test mixtures are determined both in a cell-having homeotropic edge alignment and in a cell having homogeneous edge alignment. The layer thickness of the two cell types is about 20 µm. The measurement is carried out using a rectangular wave having a frequency of 1 kHz and an effective voltage (rms, root mean square) of typically 0.1 V or 0.2 V to 1.0 V. In each case, the voltage used is lower than the capacitive threshold of the mixture investigated in each case.

For dielectrically positive compounds, mixture ZLI-4792 is used and for dielectrically neutral and dielectrically negative compounds, mixture ZLI-3086, both from Merck KGaA, Germany, is used as host mixture. These host mixtures are also used for components and media which do not have a nematic phase even at the relevant temperature or cannot be supercooled down to the relevant temperature in the nematic phase. If the solubility of the compounds, components or media in the respective host mixture is less than 10%, the concentration of the substance investigated is exceptionally reduced to 5%. If the solubility of a dielectrically positive substance (a compound, a component of a medium or a medium) in host mixture ZLI-4792 is less than 5%, nematic mixture MLC-6828, Merck KGaA, Germany, is used as host mixture. Here too, the concentration of the substance to be investigated is, if necessary, halved from 10% to 5%. The value of the pure substance is extrapolated from the change in the values compared with those of the host mixture.

The media according to the invention preferably comprise 0% to 10% of compounds whose solubility in the corresponding host mixture (ZLI-3086 or MLC-6828) is less than 5%. The concentration of these compounds is preferably 8% or less, particularly preferably 5% or less and very particularly preferably 4% or less.

The dielectric anisotropy of the compounds, components or media which are not in the nematic phase at 20° C. or at a temperature of 4° below their clearing point, or cannot be supercooled down to this temperature in this phase, are determined from a host mixture as described above in the case of the compounds.

The dielectric constants $\epsilon_\parallel$ and $\epsilon_\perp$ are determined with an absolute accuracy of about +/−0.1 to +/−0.2, which gives an absolute accuracy of about +/−0.2 to +/−0.4, typically of +/−0.3, for the dielectric anisotropy ($\Delta\epsilon$). The accuracy drops at higher values, i.e. the possible deviations increase. At values of $\Delta\epsilon$ of 25 to 40, the absolute accuracy is about +/−0.5, and at values of greater than 40, the absolute accuracy is about +/−1.0.

The dielectric susceptibility of the media is determined at a temperature of 4° above their characteristic temperature. It is referred to as the average dielectric susceptibility ($\epsilon_{av.}$) since it can also be obtained, to a first approximation, from extrapolation of the average dielectric susceptibility of the nematic medium beyond its clearing point. The dielectric susceptibility of the media is determined with an absolute accuracy of about +/−0.1 to +/−0.2. In the case of values of $\epsilon_{ave}$ of 50 or above up to 100, the absolute accuracy is about +/−0.5, and in the case of values of above 100, the absolute accuracy is about +/−2.0.

The value of the birefringence of components (B) of the media according to the invention is measured here in the nematic phase at 20° C. and at a temperature of 4° below the clearing point. If the medium is not nematically stable at one of these two temperatures or at these two temperatures or at least cannot be supercooled down to this temperature in the nematic phase, the birefringence of a mixture is extrapolated from the corresponding nematic host mixture, as described above for the determination of the dielectric anisotropy.

The term threshold voltage in the present application denotes the optical threshold and is indicated for a relative contrast of 10% ($V_{10}$). The mid-grey voltage and the saturation voltage are likewise determined optically and indicated for a relative contrast of 50% and 90% respectively. The reference quantity and characteristic value of the electro-optical characteristic line of the various media which are indicated in the present application are generally the voltage ($V_{10}$), in exceptional cases also the voltage ($V_{70}$), at which the characteristic line reaches the value of 70% relative contrast for the first time. If the capacitive threshold voltage ($V_0$), also known as the Freedericks threshold, or the voltage at which 100% relative contrast is reached ($V_{100}$) is indicated, this is stated explicitly.

The media were introduced into test cells with interdigital electrodes. The layer thickness of the test cells was generally about 10 µm. The width of the electrodes was 10 µm and the separation between the adjacent electrodes was likewise 10 µm. The electro-optical characteristic line was determined at a temperature of 2 degrees above the characteristic temperature of the respective medium. During introduction of the media into a cell, a slight increase in the clearing point was observed in some cases. This effect may be explained by a certain stabilisation of the nematic phase in thin layers. The increase in the clearing point was in some cases 0.5 degree and up to about 0.7 degree. In some rare cases, deviations of up to about 2° to 4° may occur. In the case of media in which the characteristic temperature (or the clearing point) in the cell differs from that in bulk, the characteristic temperature (the clearing point) in the cell is used for characterisation.

The wavelength of light is assumed to be 400 nm to 800 nm, preferably 555 nm.

In the present application, particularly in the examples described below, the structures of the chemical compounds are indicated by means of abbreviations. The meanings of the respective abbreviations are shown in Tables A and B below. All groups $C_nH_{2n+1}$ and $C_mH_{2m+1}$ are straight-chain alkyl groups having n and m C atoms respectively. Table B is self-evident per se since it indicates in each case the complete abbreviation for a formula of homologous compounds. In Table A, only the abbreviations for the core structures of the compound types are shown. The abbreviations for the respective individual compounds are composed of the respectively pertinent abbreviations of these for the core of the compound and the abbreviation for the groups $R^1$, $R^2$, $L^1$ and $L^2$ attached by means of a dash, in accordance with the following table.

| Abbreviation for $R^1, R^2, L^1, L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | H | F |
| nN•F•F | $C_nH_{2n+1}$ | CN | F | F |
| nON•F•F | $OC_nH_{2n+1}$ | CN | F | F |
| nOF | $OC_nH_{2n+1}$ | F | H | H |
| nCl | $C_nH_{2n+1}$ | Cl | H | H |
| nCl•F | $C_nH_{2n+1}$ | Cl | H | F |
| nCl•F•F | $C_nH_{2n+1}$ | Cl | F | F |
| nF | $C_nH_{2n+1}$ | F | H | H |
| nF•F | $C_nH_{2n+1}$ | F | H | F |
| nF•F•F | $C_nH_{2n+1}$ | F | F | F |
| nmF | $C_nH_{2n+1}$ | $C_mH_{2m+1}$ | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_3$•F | $C_nH_{2n+1}$ | OCF$_3$ | H | F |
| nOCF$_3$•F•F | $C_nH_{2n+1}$ | OCF$_3$ | F | F |
| nOCF$_2$ | $C_nH_{2n+1}$ | OCHF$_2$ | H | H |
| nOCF$_2$•F | $C_nH_{2n+1}$ | OCHF$_2$ | H | F |
| nOCF$_2$•F•F | $C_nH_{2n+1}$ | OCHF$_2$ | F | F |
| nS | $C_nH_{2n+1}$ | NCS | H | H |
| nS•F | $C_nH_{2n+1}$ | NCS | H | F |
| nS•F•F | $C_nH_{2n+1}$ | NCS | F | F |
| rVsN | $C_rH_{2r+1}$—CH=CH—$C_sH_{2s}$— | CN | H | H |
| rOsN | $C_rH_{2r+1}$—O—$C_sH_{2s}$— | CN | H | H |
| nEm | $C_nH_{2n+1}$ | $COOC_mH_{2m+1}$ | H | H |

TABLE A

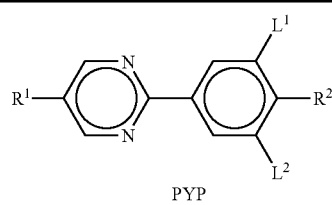

PYP

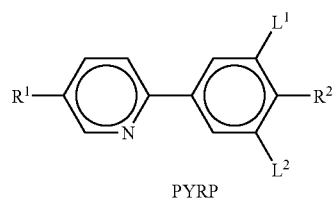

PYRP

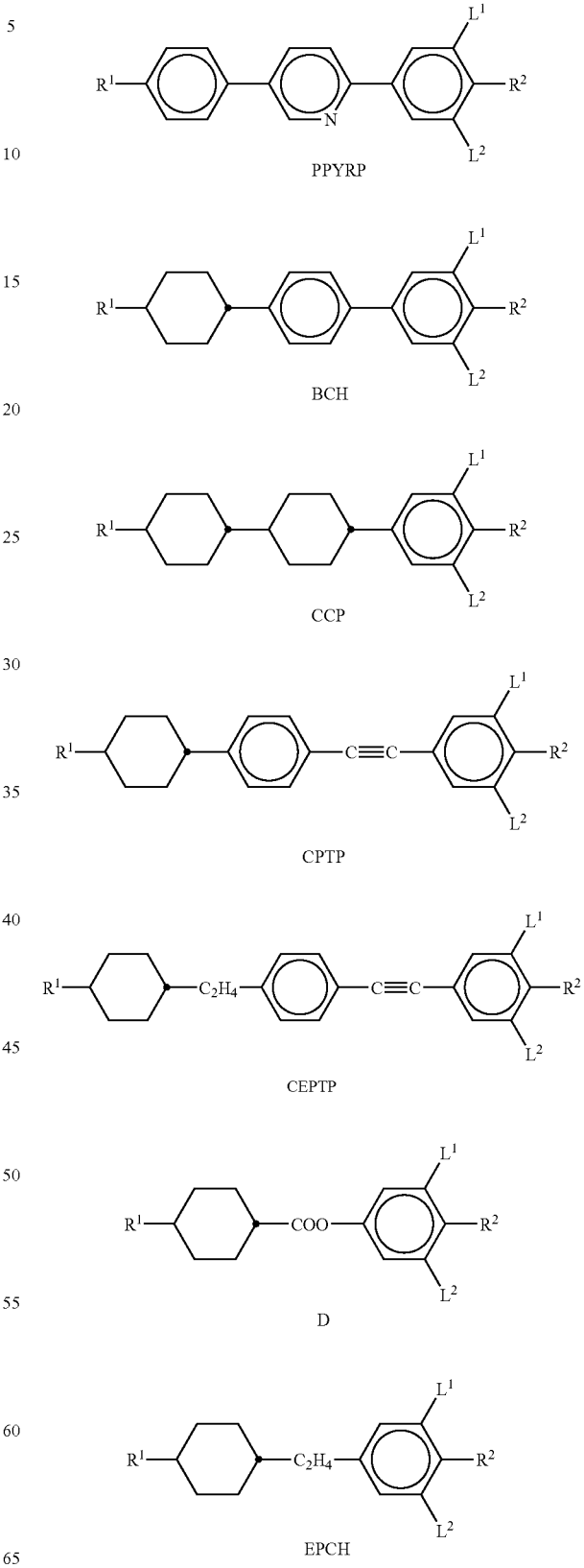

TABLE A-continued
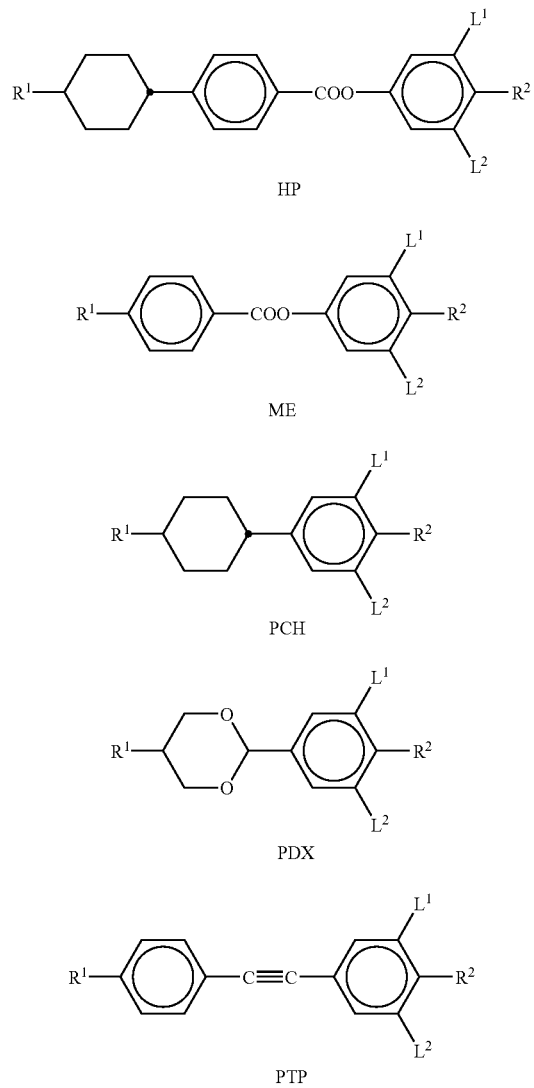
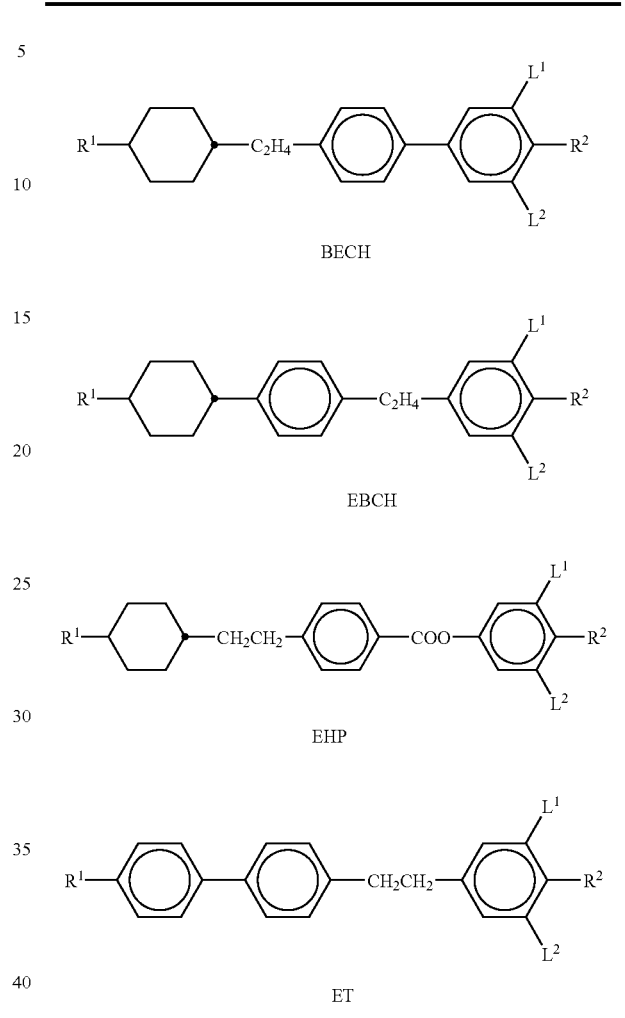
TABLE B
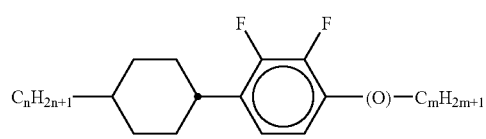
PCH-n(O)mFF
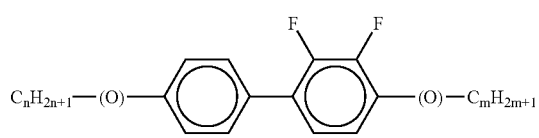
PY-n(O)-Om TABLE B-continued
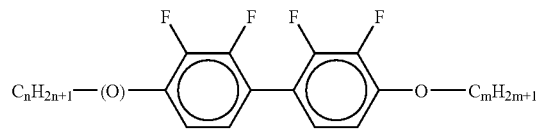
YY-n(O)-Om
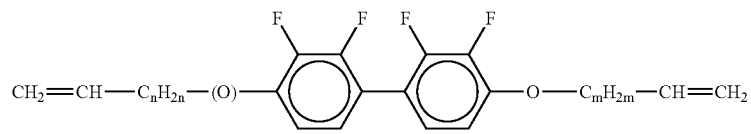
YY-Vn(O)-OmV
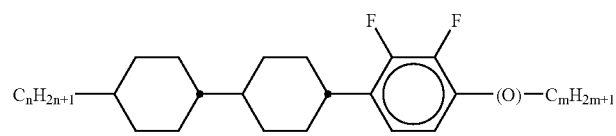
CCP-n(O)mFF
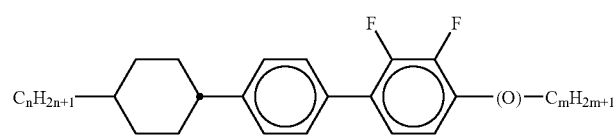
CPY-n(O)-m
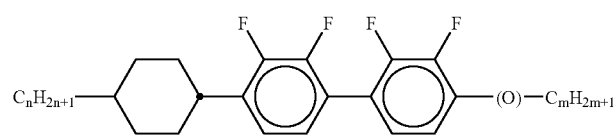
CYY-n-(O)m
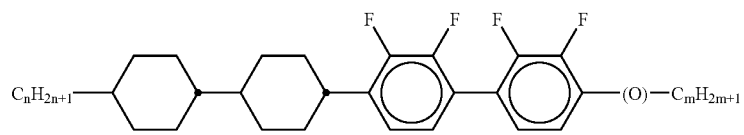
CCYY-n-(O)m
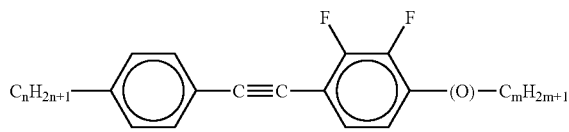
PTP-n(O)mFF
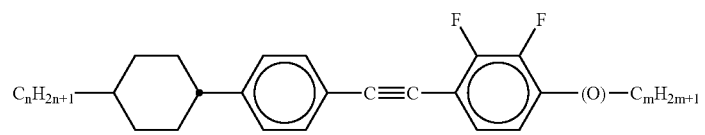
CPTP-n(O)mFF TABLE B-continued
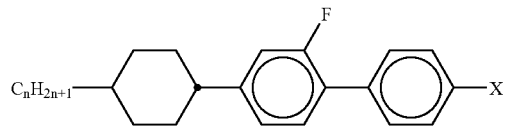
CGP-n-X
(X = particularly F, Cl, CN = "N", NCS = S and CF$_3$ = "T")
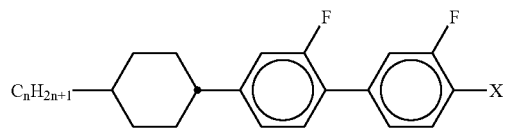
CGG-n-X
(X = particularly F, Cl, CN = "N", NCS = "S" and CF$_3$ = "T")
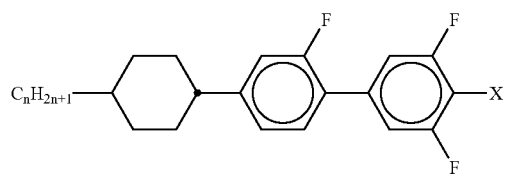
CGU-n-X
(X = particularly F, Cl, CN = "N", NCS = "S" and CF$_3$ = "T")
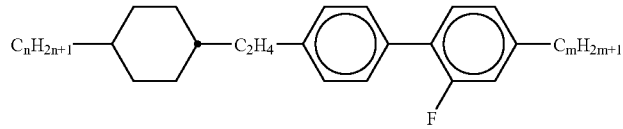
Inm
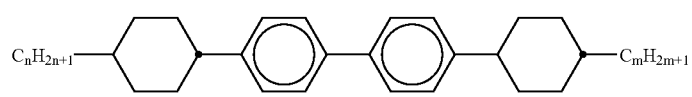
CBC-nm
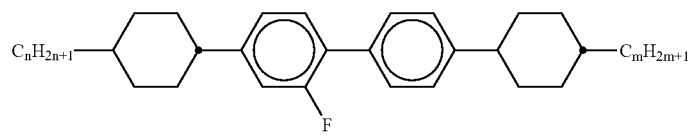
CBC-nmF
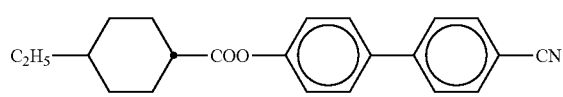
CHE
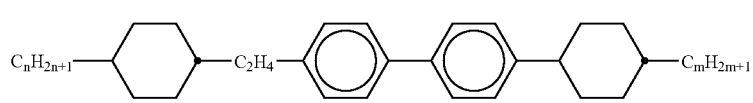
ECBC-nm
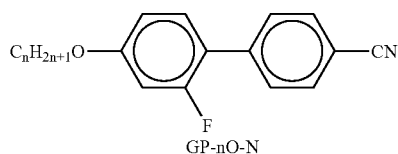
GP-nO-N TABLE B-continued
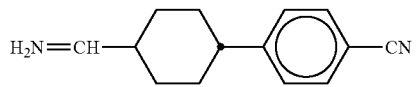
CP-V-N
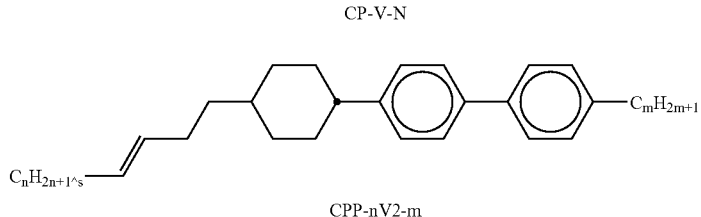
CPP-nV2-m
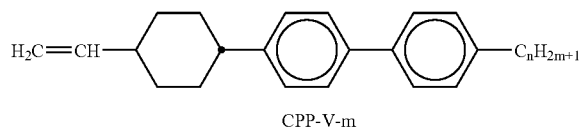
CPP-V-m
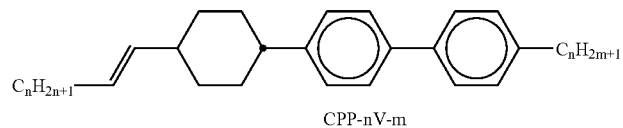
CPP-nV-m
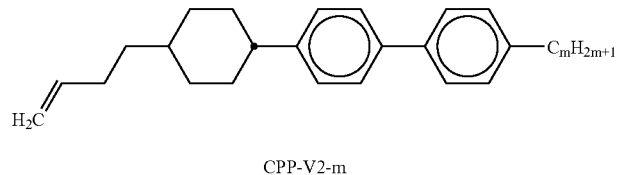
CPP-V2-m
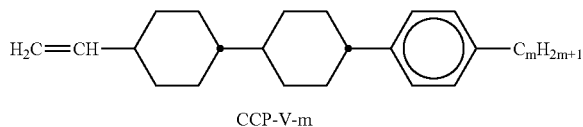
CCP-V-m
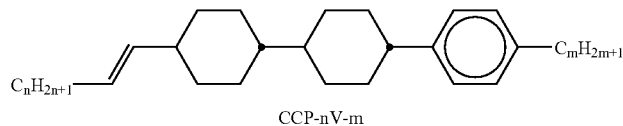
CCP-nV-m
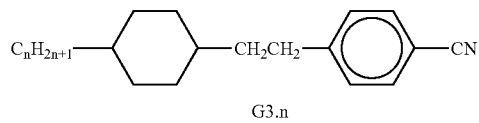
G3.n
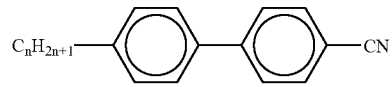
K3.n
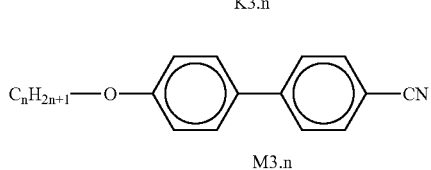
M3.n TABLE B-continued
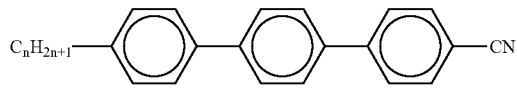
T3.n
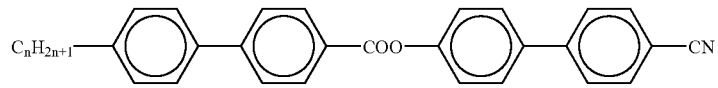
BB3.n
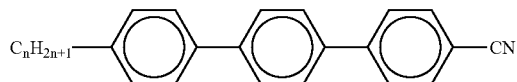
PGIP-n-N
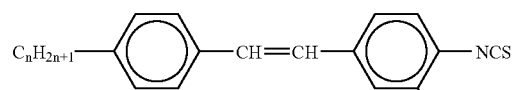
PVG-n-S
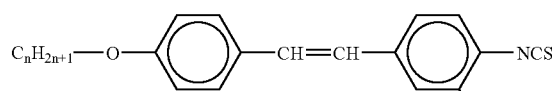
PVG-nO-S
UPP-n-S
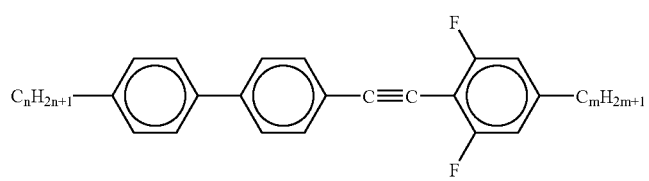
PPTUI-n-m
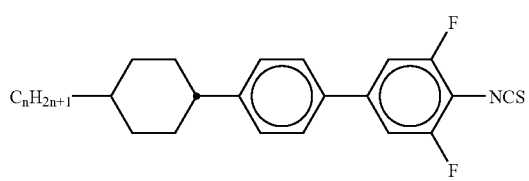
CPU-n-S TABLE B-continued
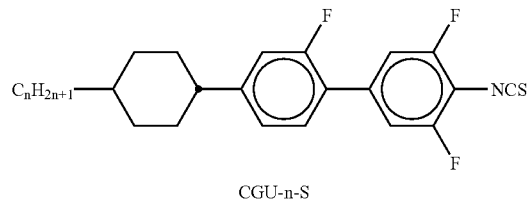
CGU-n-S
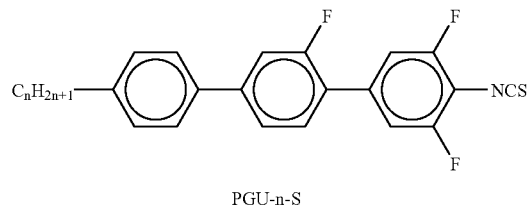
PGU-n-S
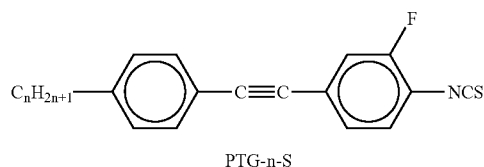
PTG-n-S
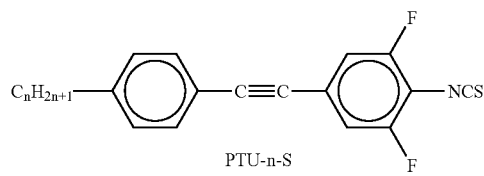
PTU-n-S
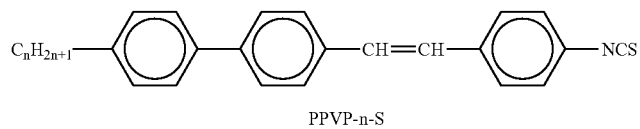
PPVP-n-S
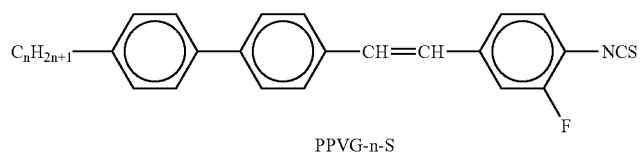
PPVG-n-S
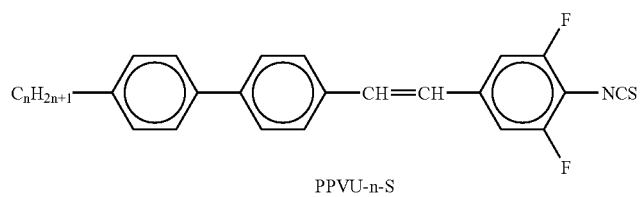
PPVU-n-S
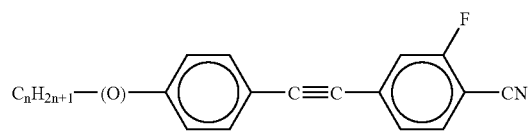
PTG-n(O)-N TABLE B-continued
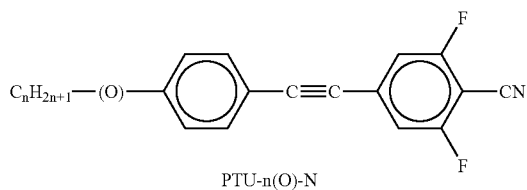
PTU-n(O)-N
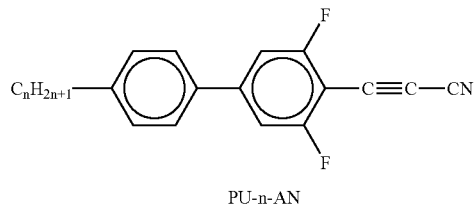
PU-n-AN
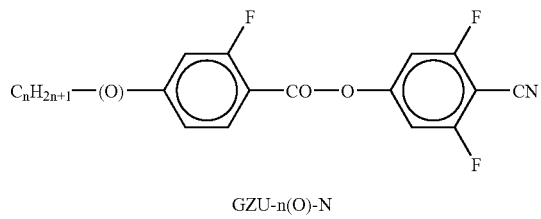
GZU-n(O)-N
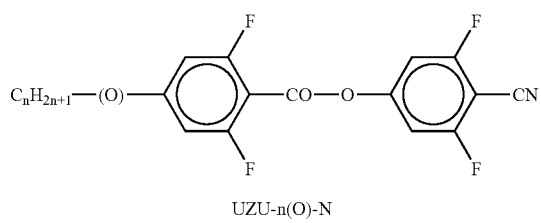
UZU-n(O)-N
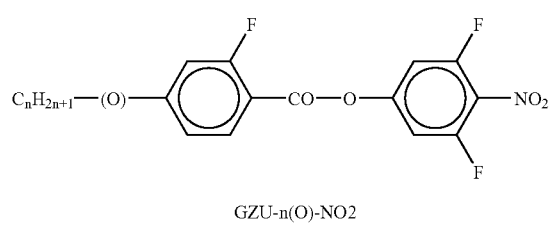
GZU-n(O)-NO2
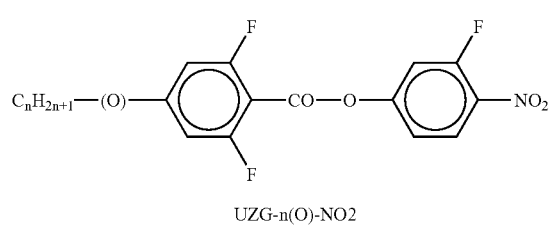
UZG-n(O)-NO2
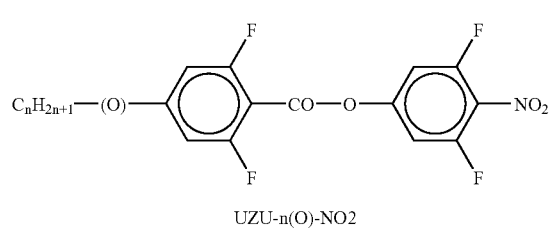
UZU-n(O)-NO2

TABLE B-continued
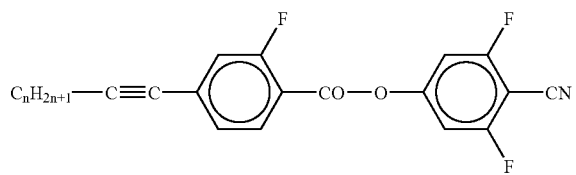
GZU-nA-N
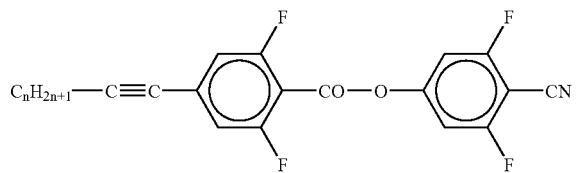
UZU-nA-N
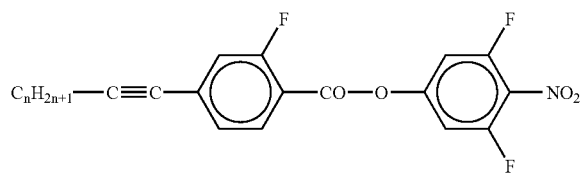
GZU-nA-NO2
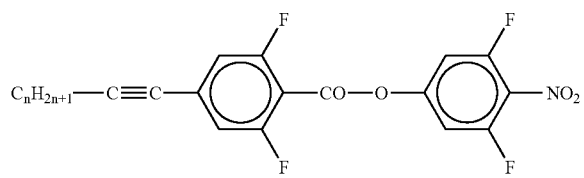
UZU-nA-NO2
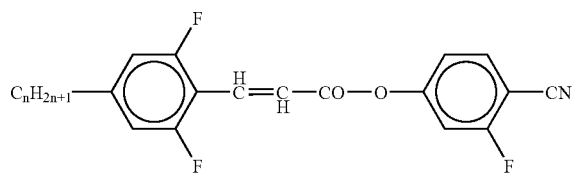
UVZG-n-N
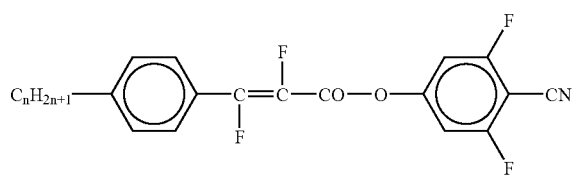
PWZU-3-N
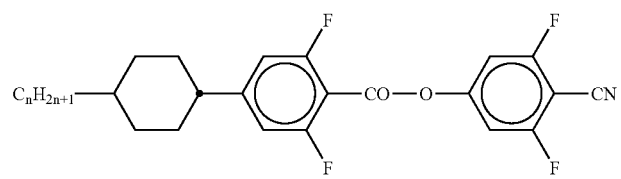
CUZU-n-N TABLE B-continued
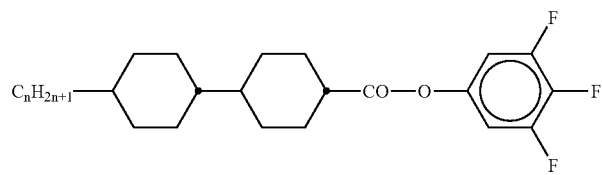
CCZU-n-F
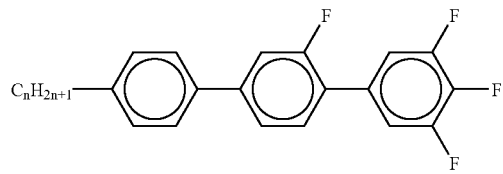
PGU-n-F
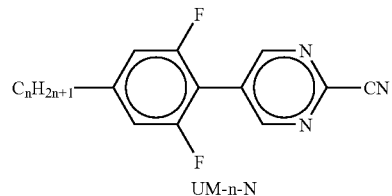
UM-n-N
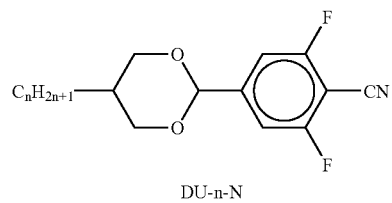
DU-n-N
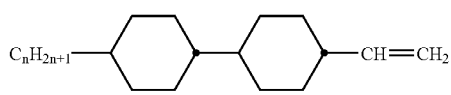
CC-n-V
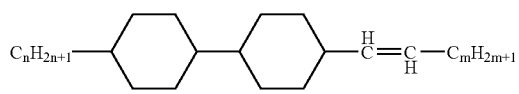
CC-n-Vm
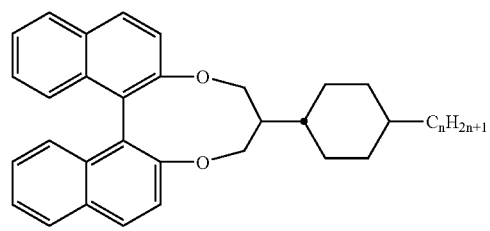
B(OC)2C*H—C-n TABLE B-continued
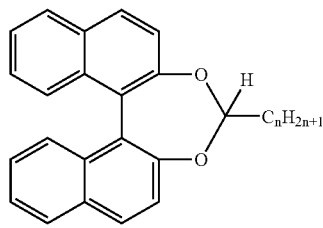
BO2C*H-n
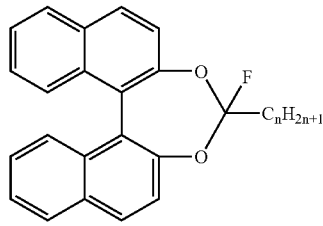
BO2C*F-n
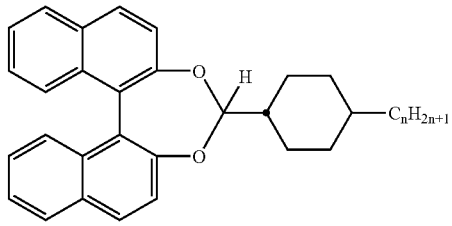
BO2C*H—C-n
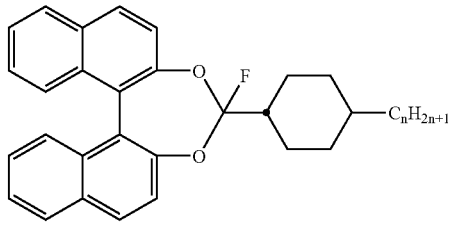
BO2C*F—C-n
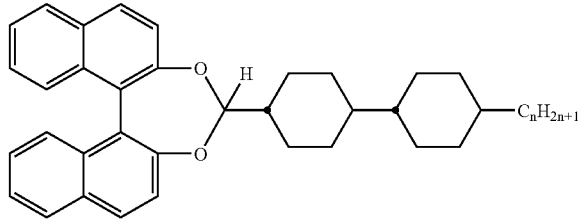
BO2C*H—CC-n
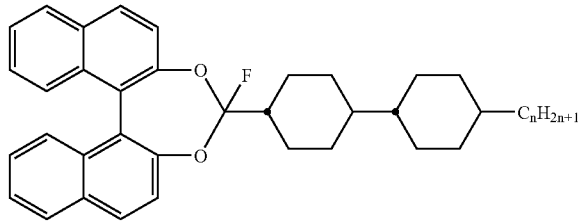
BO2C*F-CC-n TABLE B-continued
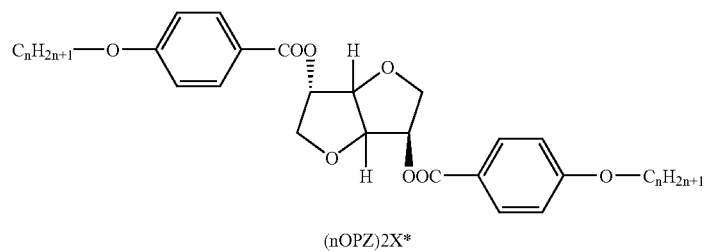
(nOPZ)2X*
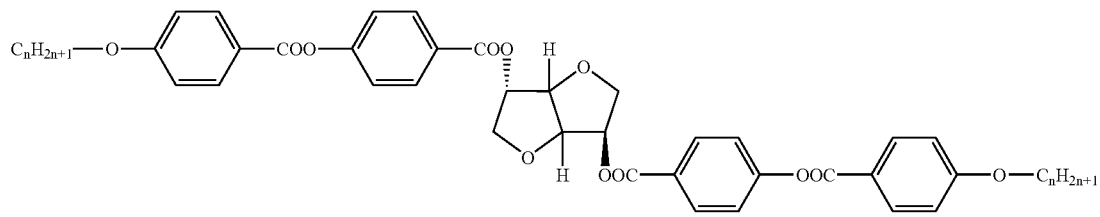
(nOPZPZ)2X*
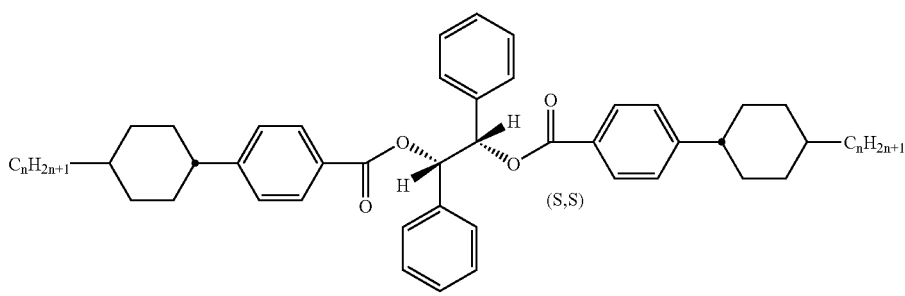
SS-(nCPZ)2BE
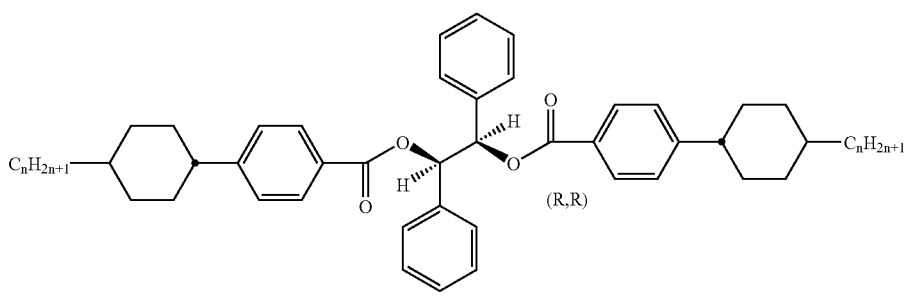
RR-(nCPZ)2BE
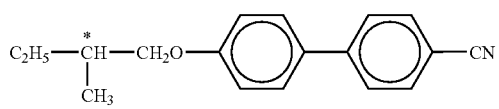
C 15
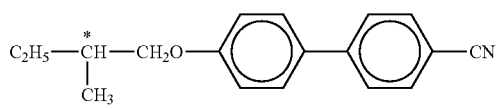
CB 15

TABLE B-continued
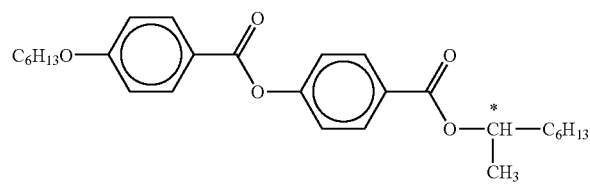
R/S-811
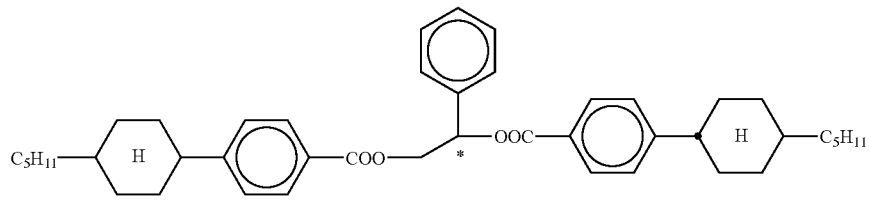
R S-1011/S-1011
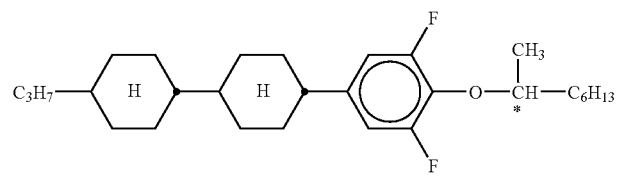
R-2011/S-2011
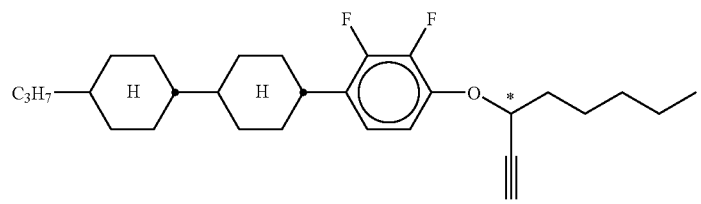
R S-3011/S-3011
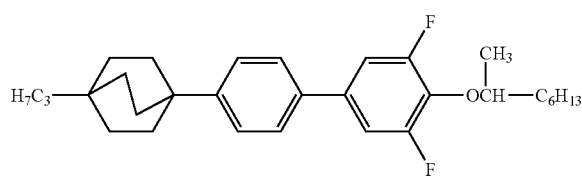
R-4011/S-4011
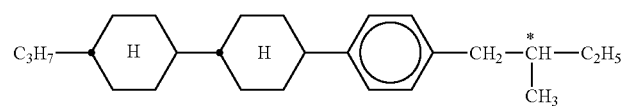
CM 44

TABLE B-continued

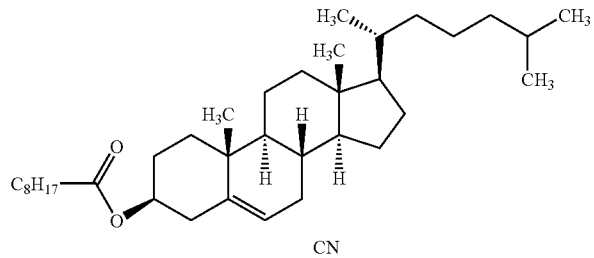

The mesogenic media in accordance with the present application preferably comprise

- four or more, preferably six or more, compounds selected from the group consisting of the compounds from Tables A and B and/or
- five or more compounds selected from the group consisting of the compounds from Table B and/or
- two or more compounds selected from the group consisting of the compounds from Table A.

The media according to the invention in accordance with the present application may, if necessary, comprise one or more further compounds in small amounts as stabilisers or for adjusting the specific resistance. They preferably comprise one or more stabilisers, preferably selected from the list of the following compounds from Table C.

TABLE C

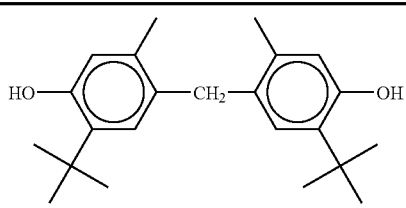

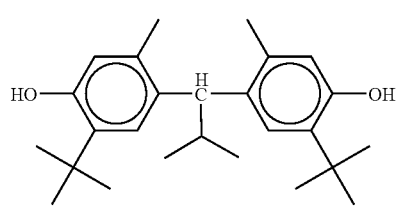

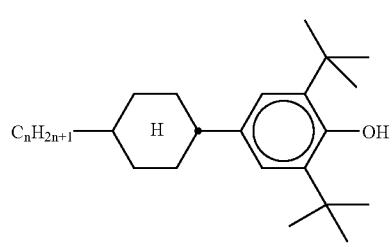

TABLE C-continued

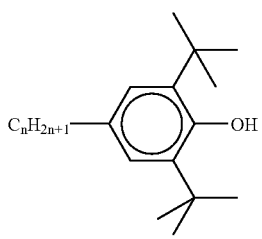

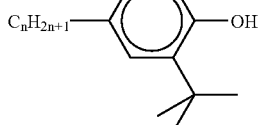

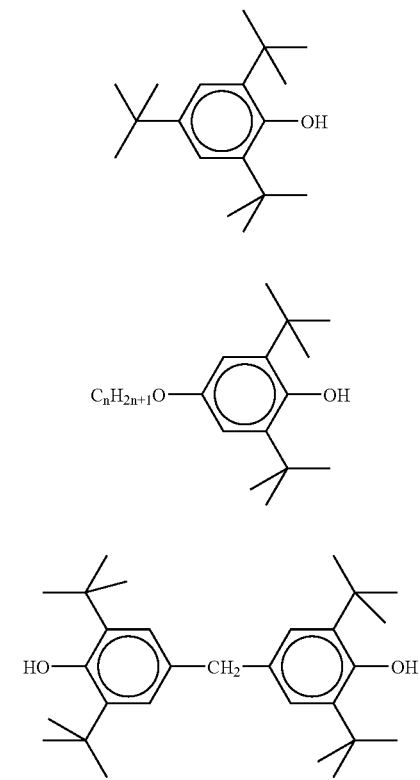

TABLE C-continued

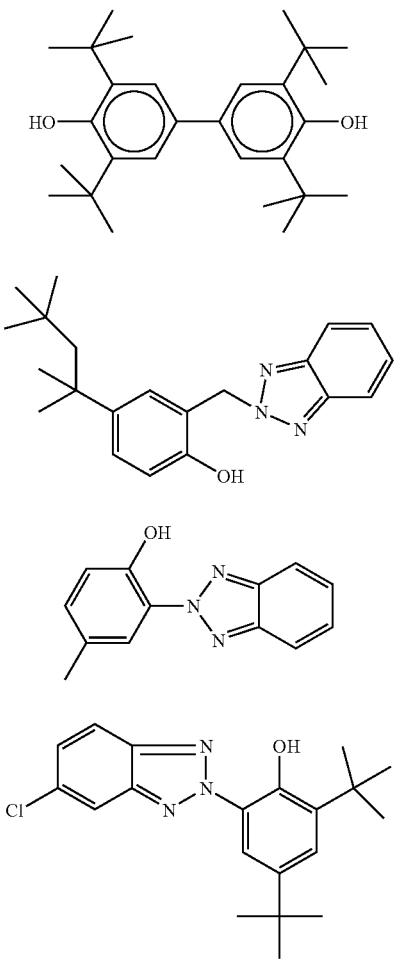

TABLE C-continued

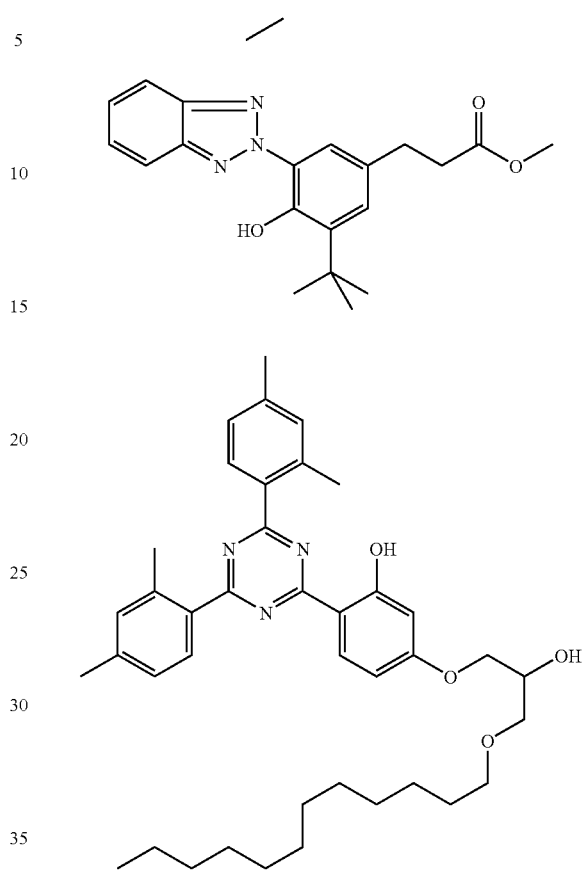

A typical compound which can be employed for adjusting the specific resistance has the following formula:

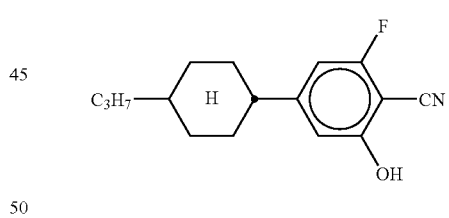

EXAMPLES

The examples described below illustrate the present invention without restricting it in any way. They furthermore demonstrate to the person skilled in the art which properties and in particular which property combinations can be achieved by means of the present invention.

Example 1 and Comparative Examples 1a to 1 d

Comparative Example 1a

The achiral liquid-crystal mixture AM-1 having the following composition was prepared and investigated.

| Composition | | |
|---|---|---|
| Compound # | Abbreviation | Conc./ % by weight |
| 1 | UZU-3A-N | 7.5 |
| 2 | GZU-3A-N | 15.0 |
| 3 | GZU-4A-N | 15.0 |
| 4 | GZU-4O-N | 15.0 |
| 5 | PU-3-AN | 10.0 |
| 6 | PTU-4O-N | 15.0 |
| 6 | CUZU-2-N | 15.0 |
| 7 | CUZU-3-N | 7.50 |
| Σ | | 100.0 |

| Physical properties | |
|---|---|
| T(N, I) = | 5.7° C. |
| Δε(20° C., 1 kHz) > | 0 |
| $\varepsilon_{av.}$(T(N, I) + 4°) = | 55.0 |
| $V_{70}$(T(N, I) + 2°) = | 45.0 V |
| $dV_{70}$(T(N, I) + 2°)/dT = | 11.5 V/degree |
| $dV^*_{70}$/($V_{70}$)/dT | 26%/degree |

This liquid-crystal mixture was introduced into a test cell and investigated with respect to its electro-optical properties at a temperature of 7.7° C. and over a temperature range from 6.2° C. to 10.7° C. (5° above the clearing point).

The test cell used had interdigital electrodes on only one of the two substrates. An electro-optical test cell having a light-switching element containing the liquid-crystal mixture was produced. The substrates consisted of glass. Substrates without alignment layer and without passivation layer were used. The electrode structure consisted of intermeshing comb-shaped electrodes. The separation of the electrodes from one another was 10 μm and the width of the electrodes was 10 μm. The layer thickness of the electrodes was about 100 nm. The electrodes were all located in a common plane. The layer thickness of the modulation medium was about 10 μm.

A first polariser was used in front of the cell and a second polariser was used as analyser behind the cell. The absorption axes of the two polarisers formed an angle of 90° to one another. The angle between the axis of maximum absorption of the polarisers and the component of the electric field in the plane of the display was in each case 45°. The voltage/transmission characteristic line was determined using a DMS 703 electro-optical measurement station from Autronic-Melchers, Karlsruhe, Germany. In the case of perpendicular observation, a curve was obtained as is typical for a cell having electrically controlled birefringence (for example ECB).

With increasing temperature above the clearing point of the medium, the characteristic voltages increase monotonously. At 7.7° C., $V_{70}$ is 45 V. The results are shown in the following table.

TABLE 1

| Characteristic voltages of various examples | | | | | |
|---|---|---|---|---|---|
| | Example | | | | |
| | C. 1a | 1 | 2c | 2d | 3b |
| Component (B) | AM-1 | | AM-2 | | AM-3 |
| Component (A) | none | BC*HC | DM-2 | PPX* | BC*HC |
| Conc. (A)/% | 0 | 3 | 15 | 10 | 5 |
| T(N, I)/° C. | 5.7 | n.d. | n.d. | n.d. | n.d. |

TABLE 1-continued

| Characteristic voltages of various examples | | | | | |
|---|---|---|---|---|---|
| | Example | | | | |
| | C. 1a | 1 | 2c | 2d | 3b |
| $T_{char.}$/° C. | 5.7 | 11.5 | −8.2 | 9 | 36.3 |
| Electrode separation 10 μm, electrode width 10 μm | | | | | |
| Characteristic voltages | | | | | |
| T − $T_{Char.}$/° | | | $V_{70}$/V | | |
| 0.5 | 22 | 27 | 31 | n.d. | 31 |
| 1.0 | 31 | 33 | 38 | 36.5 | 34 |
| 1.5 | 39 | 38 | 43 | 38.5 | 36 |
| 2.0 | 45 | 42 | 49 | 40.5 | 37 |
| 2.5 | n.d. | n.d. | n.d. | 42.5 | 38 |
| 3.0 | 55 | 51 | 59 | 44.5 | 39 |
| 4.0 | 63 | 58 | 67 | 49 | 42 |
| 5.0 | 71 | 65 | 73 | 52 | 46 |
| Temperature dependence | | | | | |
| $V_{70}(T_{char.} + 2°)$/V | 45 | 40 (23§) | 49 | 40.5 | 37 |
| $dV_{70}$/dT/V/degree | 11.5 | 20 (2§) | 10.5 | 4 | 2.5 |
| $dV^*_{70}$/dT/ %/degree | 26 | 45 (9§) | 21 | 9.9 | 6.8 |

Notes:
BC*HC: B(OC)2C*H—C-3,
PPX*: (1OPZPZ)2X*,
n.d.: not determined,
$dV_{70}$/dT: $[V_{70}(T_{char.} + 3°) − V_{70}(T_{char.} + 1°)/(2°)]$,
$dV^*_{70}$/dT: $[V_{70}(T_{char.} + 3°) − V_{70}(T_{char.} + 1°)/(V_{70}(T_{char.} + 2°) \cdot 2°)]$.
§values at $T_{char.} + 0.5°$.

Example 1

A mixture comprising 97% of the achiral liquid-crystal mixture AM-1 of Comparative Example 1a and 3% of the chiral compound B(OC)2C*H—C-3 is prepared and investigated. The chiral compound in the form used has an HTP at 20° C. of +137 μm$^{-1}$ (in MLC-6828) and +104 μm$^{-1}$ in MLC-6260.

| Composition | | |
|---|---|---|
| Compound # | Abbreviation | Conc./ % by weight |
| 1 | B(OC)2C*H—C-3 | 3.0 |
| 2 | UZU-3A-N | 7.25 |
| 3 | GZU-3A-N | 14.55 |
| 4 | GZU-4A-N | 14.55 |
| 5 | GZU-4O-N | 14.55 |
| 6 | PU-3-AN | 9.7 |
| 7 | PTU-4O-N | 14.55 |
| 8 | CUZU-2-N | 14.55 |
| 9 | CUZU-3-N | 7.25 |
| Σ | | 100.0 |

| Physical properties | |
|---|---|
| $T_{char.}$ = | 11.5° C. |
| $\varepsilon_{av.}(T_{char.} + 6°)$ = | 69.9 |
| $V_{70}(T_{char.} + 0.5°)$ = | 23 V |
| $dV_{70}(T_{char.} + 0.5°)/dT$ = | 2 V/° |
| $dV^*_{70}/(V_{70})/dT$ = | 9%/° |
| $V_{70}(T_{char.} + 2°)$ = | 40 V |
| $dV_{70}(T_{char.} + 2°)/dT$ = | 20 V/° |
| $dV^*_{70}/(V_{70})/dT$ = | 45%/° |
| $V_{70}(T_{char.} + 2.2°)$ = | 42 V |

The mixture has a blue phase over a range of about 2 degrees with the following phase sequence: N* 11.5° C. BP 13.5° C. I.

The mixture is, as described in Comparative Example 1a, introduced into a test cell and investigated as described. In particular, its electro-optical properties are investigated at a temperature up to a few degrees above its characteristic temperature. The results are shown in Table 1 for comparison with those of Comparative Example 1a.

As can be seen from this table, the characteristic voltage $V_{70}$ of the liquid-crystal switching elements of Example 1 are somewhat greater at temperatures close to above the characteristic temperature than that of Comparative Example 1a at the corresponding temperatures. The characteristic voltage of the liquid-crystal switching elements of Example 1, like that of Comparative Example 1a, increases monotonously with increasing temperature. However, the increase in the characteristic voltage in the liquid-crystal switching elements of Example 1a is initially significantly less than in those of Comparative Example 1, so that the two switching elements exhibit virtually the same voltage $V_{70}$ at a temperature of only 1.50 above their reference temperature. The temperature dependence at a temperature of 20 above the respective characteristic temperature is reduced from greater than 25% to less than 20% in comparison of the light modulation elements of Comparative Example 1a with those of Example 1. At a temperature of 0.50 above the characteristic temperature, the relative temperature dependence of the characteristic voltage $dV*_{70}(N_{70})/dT$ here is 9%/°, and the relative temperature dependence of the characteristic voltage $dV*_{70}(N_{70})/dT$ is 45%/° at a temperature of 2° above the characteristic temperature.

In the case of the mixtures of Example 1 and Comparative Example 1a, cells having an electrode separation of 15 μm and an electrode width of 10 μm were additionally investigated. The results are shown in Table 2.

TABLE 2

| | Characteristic voltages | | | | |
|---|---|---|---|---|---|
| | Example: | | | | |
| | C. 1a | C. 1b | C. 1c | C. 1d | 1 |
| Component (A) | none | | | | BC*HC |
| Conc. (A)/% | 0 | | | | 3 |
| Component (B) | AM-1 | see text | see text | see text | AM-1 |
| | Physical parameters | | | | |
| T(N, I)/° C. | 5.7 | 23.8 | 23.7 | 14.3 | n.d. |
| $T_{char.}$ + 2°/° C. | 7.7 | 25.8 | 25.7 | 16.3 | 13.5 |
| $\epsilon_{av.}(T_{char.}$ + 4°) | 55.0 | 24.0 | 58.5 | 62.2 | 69.9 |
| Electrode separation 15 μm, electrode width 10 μm | | | | | |
| | Temperature dependence | | | | |
| $V_{70}(T_{char.}$ + 2°)/V | 67 | 134 | 71 | 70 | 23§ |
| $dV_{70}/dT$/V/degree | 17 | 38 | 18 | 17 | 2§ |
| $dV*_{70}/dT$/%/degree | 25 | 28 | 25 | 24 | 9§ |

Notes:
see Table 1,
BC*HC: B(OC)2C*H—C-3,
§values at $T_{char.}$ + 0.5°.
The electrode separation in the cells used was exceptionally 15 μm here, in Table 2.

Comparative Examples 1b to 1d

In Comparative Examples 1b to 1d, achiral modulation media were used, as in Comparative Example 1a, in contrast to Example 1. Here, however, modulation media which had different compositions from the modulation media of Comparative Example 1a were used.

Comparative Example 1b

A mixture having the following composition and the following properties was prepared and investigated.

| | Composition | |
|---|---|---|
| Compound # | Abbreviation | Conc./% by weight |
| 1 | ME2N•F | 3.0 |
| 2 | ME3N•F | 3.0 |
| 3 | ME4N•F | 8.0 |
| 4 | ME5N•F | 8.0 |
| 5 | UM-3-N | 4.0 |
| 6 | PTG-3-N | 8.0 |
| 7 | PTG-5-N | 8.0 |
| 8 | PTU-4O-N | 8.0 |
| 9 | PU-3-AN | 8.0 |
| 10 | PU-5-AN | 8.0 |
| 11 | PGU-2-F | 10.0 |
| 12 | PGU-3-F | 10.0 |
| 13 | PGU-5-F | 10.0 |
| 14 | HP-3N.F | 4.0 |
| Σ | | 100.0 |
| Physical properties | | |
| T(N, I) = | | 23.8° C. |
| Δn(20° C., 589.3 nm) = | | 0.1444 |
| Δε(20° C., 1 kHz) = | | 27.3 |
| $\epsilon_{av.}(T(N, I) + 4°)$ = | | 24.0 |
| $V_{70}(T(N, I) + 2°)$ = | | 89 V |
| $dV_{70}/dT(T(N, I) + 2°)$ = | | 25 V/degree |

The results are shown in Table 2.

Comparative Example 1c

A mixture having the following composition and the following properties was prepared and investigated.

| | Composition | |
|---|---|---|
| Compound # | Abbreviation | Conc./% by weight |
| 1 | UZU-3A-N | 12.0 |
| 2 | UZU-5A-N | 12.0 |
| 3 | GZU-3A-N | 12.0 |
| 4 | GZU-4A-N | 11.0 |
| 5 | GZU-4O-N | 10.0 |
| 6 | UVZG-3-N | 10.0 |
| 7 | CUZU-2-N | 10.0 |
| 8 | CUZU-3-N | 10.0 |
| 9 | CUZU-4-N | 10.0 |
| 10 | HP-5N•F | 3.0 |
| Σ | | 100.0 |
| Physical properties | | |
| T(N, I) = | | 23.7° C. |
| Δn(20° C., 589.3 nm) = | | 0.0925 |
| Δε(20° C., 1 kHz) = | | 46.1 |
| ΔH(N, I) = | | 0.80 J/g |

-continued

| | | |
|---|---|---|
| $\epsilon_{av.}(T(N, I) + 4°) =$ | 58.5 | |
| $V_{70}(T(N, I) + 2°) =$ | 47 V | |
| $dV_{70}/dT(T(N, I) + 2°) =$ | 10 V/degree | |

The results are shown in Table 2.

Comparative Example 1d

A mixture having the following composition and the following properties was prepared and investigated.

| Composition | | |
|---|---|---|
| Compound # | Abbreviation | Conc./ % by weight |
| 1 | UZG-5A-NO2 | 10.0 |
| 2 | UZU-3A-N | 10.8 |
| 3 | UZU-5A-N | 10.8 |
| 4 | GZU-3A-N | 10.8 |
| 5 | GZU-4A-N | 9.9 |
| 6 | GZU-4O-N | 9.0 |
| 7 | UVZG-3-N | 9.0 |
| 8 | CUZU-2-N | 9.0 |
| 9 | CUZU-3-N | 9.0 |
| 10 | CUZU-4-N | 9.0 |
| 11 | HP-5N•F | 2.7 |
| Σ | | 100.0 |

| Physical properties | |
|---|---|
| $T(N, I) =$ | 14.3° C. |
| $\Delta\epsilon(20° C., 1 kHz) >$ | 0 |
| $\epsilon_{av.}(T(N, I) + 4°) =$ | 62.2 |
| $V_{70}(T(N, I) + 2°) =$ | 47 V |
| $dV_{70}/dT(T(N, I) + 2°) =$ | 11 V/degree |

The results are shown in Table 2.

The media of Comparative Examples 1b to 1d were investigated, as in Example 1 and Comparative Example 1a, in cells having an electrode separation of 15 μm and an electrode width of 10 μm. The results are shown in Table 2.

As can be seen from Table 2, the temperature dependence of the relative characteristic voltage $V_{70}$ is, at about 25%, virtually identical for all four comparative examples, whereas it is only 9% in Example 1.

Examples 2a to 2d and Comparative Example 2

Comparative Example 2

Firstly, the achiral mixture AM-2 having the following composition is prepared and investigated.

| Composition | | |
|---|---|---|
| Compound # | Abbreviation | Conc./ % by weight |
| 1 | UZU-3A-N | 15.0 |
| 2 | UZU-5A-N | 5.6 |
| 3 | GZU-3A-N | 15.0 |
| 4 | GZU-4A-N | 15.0 |
| 5 | GZU-4O-N | 12.0 |
| 6 | CUZU-2-N | 11.0 |
| 7 | CUZU-3-N | 11.0 |

-continued

| | | |
|---|---|---|
| 8 | CUZU-4-N | 11.0 |
| 9 | HP-3N•F | 4.4 |
| Σ | | 100.0 |

| Physical properties | |
|---|---|
| $T(N, I)_{bulk} =$ | 22.5° C. |
| $T_{char.}$ | 24.4 |
| $\epsilon_{av.}(T_{char.} + 4°) =$ | 60.8 |
| $V_{70}(T_{char.} + 2°) =$ | 59 V |
| $dV_{70}/dT(T_{char.} + 2°) =$ | 10 V/degree |
| $dV^*_{70}/(V_{70})/dT$ | 17%/degree |

Example 2a

A mixture comprising 90% of the achiral liquid-crystal mixture AM-2 of Comparative Example 2 and 10% of the chiral compound B(OC)2C*H—C-3 is prepared and investigated. This mixture had a characteristic temperature of 22.5° C., but 24.4° C. in the cell, which is assumed here to be the characteristic temperature. The temperature dependence of the voltage $V_{70}$ is shown in the following table (Table 3).

TABLE 3

Temperature dependence of the characteristic voltages of Example 2a

| # | T/° C. | $V_{70}$/V |
|---|---|---|
| 1 | −19.3 | 156 |
| 2 | −17.3 | 116 |
| 3 | −15.5 | 93 |
| 4 | −13.5 | 82 |
| 5 | −11.6 | 80 |
| 6 | −9.6 | 82 |
| 7 | −7.7 | 88 |
| 8 | −5.6 | 94 |
| 9 | −3.7 | 102 |
| 10 | −1.9 | 108 |
| 11 | 2.0 | 125 |
| 12 | 5.9 | 143 |
| 13 | 9.7 | 164 |

As can be seen from this table (Table 3), the characteristic voltage $V_{70}$ of the cell containing this doped mixture does not increase with increasing temperature, as in Comparative Example 1a and Example 1, but instead initially decreases with increasing temperature, then passes through a minimum at about −11.6° C. and only then rises again with further increasing temperature. The temperature of −11.6° C. is, in accordance with the present application, referred to as the characteristic temperature since the characteristic voltage passes through a minimum. In a temperature range of about +/−3° around this temperature (i.e. $T_{char.}$=−11.6° C.), the temperature dependence ($dV^*_{70}/dT$) virtually disappears, i.e. is about 0 V/degree.

The phase range of the blue phase indicated here is the range from a temperature of −19.3° C. to 13° C. The voltage only reaches 156 V at low temperatures, i.e. less than double the value of the minimum voltage of 80 V. The lower limit of the temperature-range is the temperature at which the electro-optical effect can first be utilised. It can be determined from the response time observed. At a temperature of 13° C., a voltage of 164 V is achieved, somewhat more than twice the value of the minimum voltage.

When specifying this upper limit, as also in the corresponding case for the lower limit, interpolation to values having an accuracy of less than one degree is omitted.

Example 2b

85% of the achiral liquid-crystal mixture AM-2 of Example 1 was with 15% of the dopant mixture DM-1 having the following composition.

Composition DM-1

| Compound # | Abbreviation | Conc./ % by weight | HTP (MLC-6828)/ $\mu m^{-1}$ | HTP (MLC-6260)/ $\mu m^{-1}$ |
|---|---|---|---|---|
| 1 | B(OC)2C*H—C-3 | 28.6 | +137 | +104 |
| 2 | (6OPZ)$_2$X* | 14.2 | +58 | n.d. |
| 3 | (1OPZPZ)$_2$X* | 14.3 | +80 | n.d. |
| 4 | SS-(5CPZ)2BE | 14.2 | −56 | n.d. |
| 5 | RR-(5CPZ)2BE | 14.3 | +56 | n.d. |
| 6 | R-1011 | 14.4 | n.d. | +27 |
| Σ | | 100.0 | | |

Notes:
see Table 1

The chiral compounds used in the dopant mixture DM-1 all, apart from one exception, have a high, positive value of the HTP in the reference mixture having the stated composition.

For the resultant modulation medium, it was not possible to determine a clearing point or a transition into the blue phase under the microscope at temperatures down to −20° C. The mixture comprising 85% of AM-2 and 15% of DM-1 is mixed with 0.1% of the phenol of the formula

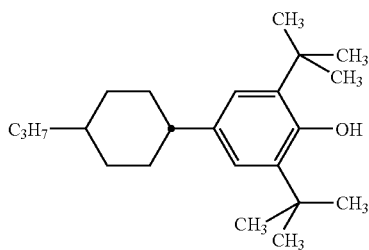

introduced into a test cell and investigated as described in Comparative Example 1a. In particular, its electro-optical properties are determined at various temperatures above its characteristic temperature. The results are shown in Table 4 and in Table 5 for comparison with those of Example 2a.

TABLE 4

Temperature dependence of the characteristic voltages of Example 2b

| # | T/° C. | $V_{70}$/V |
|---|---|---|
| 1 | −11.4 | 71 |
| 2 | −10.5 | 67 |
| 3 | −9.5 | 65 |
| 4 | −8.5 | 64 |
| 5 | −7.5 | 65 |
| 6 | −6.6 | 68 |
| 7 | −5.6 | 71 |
| 8 | −3.6 | 81 |
| 9 | −2.7 | 85 |
| 10 | −1.8 | 90 |
| 11 | −0.9 | 94 |
| 12 | 0.1 | 100 |
| 13 | 1.2 | 106 |
| 14 | 2.2 | 111 |
| 15 | 4.0 | 121 |

As can be seen from this table (Table 4), the characteristic voltage $V_{70}$ of the cell containing this doped mixture is virtually independent of the temperature over a temperature range from −11.4° C. to −5.6° C.

As in Example 2a, $V_{70}$ here again initially decreases with increasing temperature and only then increases again with further increasing temperature. The minimum of $V_{70}$ is about −8.5° C. In a temperature range of about +/−2° around this reference temperature, the temperature dependence of the characteristic voltage ($dV_{70}/dT$) again disappears virtually completely here (compare Table 5).

TABLE 5

Temperature dependence of the characteristic voltages of Examples 2a and 2b

| | Example | | | |
|---|---|---|---|---|
| | 2a | | 2b | |
| Comp. (B) | AM-2 | | | |
| Comp. (A) | B(OC)2C*H—C-3 | | DM-1 | |
| Conc. (A)/% | 10 | | 15 | |
| $T_{char.}$/° C. | −11.6 | | −8.5 | |
| | Temperature dependence | | | |
| $T - T_{char.}$ §/ degree | $\Delta V_{70}/\Delta T$/ V/degree | $\Delta V^*_{70}/\Delta T$/ %/degree | $\Delta V_{70}/\Delta T$/ V/degree | $\Delta V^*_{70}/\Delta T$/ %/degree |
| +1 | 2 | 1 | 2 | 3 |
| +2 | 2.5 | 3 | 4 | 4 |
| +3 | n.d. | n.d. | n.d. | n.d. |
| +4 | 3 | 3 | 4.5 | 5.5 |
| +6 | 3.5 | 3.5 | 5 | 6 |
| +8 | 4 | 3.5 | 5.5 | 5.5 |

Notes:
see Table 1,
$\Delta V_{70}/\Delta T$ (T): $[V_{70}(T + 1°) - V_{70}(T - 1°)/(2°)]$,
$\Delta V^*_{70}/\Delta T$ (T): $[V_{70}(T + 1° - V_{70}(T - 1°)/(V_{70}(T) \cdot 2°)]$,
§the temperature range here was only extended on one side.

Example 2c

85% of the liquid-crystal mixture AM-2 of Comparative Example 2 were again mixed, as in Example 2b, with 15% of a dopant mixture. Here, however, dopant mixture DM-2 having the following composition was used.

| Composition DM-2 | | | |
|---|---|---|---|
| Compound | Conc./% | 6828/ | HTP(MLC-6260)/ |
| # Abbreviation | by weight | µm$^{-1}$ | µm$^{-1}$ |
| 1 BO2C*F—CC-3 | 18.3 | n.d. | n.d. |
| 2 BO2C*F-5 | 35.8 | +59 | n.d. |
| 3 RR-(5CPZ)2BE | 18.2 | +56 | n.d. |
| 4 (1OPZPZ)$_2$X* | 9.3 | +80 | n.d. |
| 5 R-1011 | 18.4 | n.d. | +27 |
| Σ | 100.0 | | |

Notes:
see Table 1,

The chiral compounds used in the dopant mixture DM-2 have HTP values which increase with rising temperature in the reference mixture. The resultant mixture has a characteristic temperature.

The mixture comprising 85% of AM-2 and 15% of DM-2 is mixed with 0.1% of the phenol used in Example 2b, introduced into a test cell and investigated as described in Comparative Example 1a. In particular, its electro-optical properties are determined at various temperatures above its characteristic temperature. These results are likewise shown in Table 1 for comparison with those of Comparative Example 1a and Example 1.

Example 2d

10% of the chiral compound (1OPZPZ)2X* were added to the mixture AM-2 of Comparative Example 4.

It was not possible to observe a blue phase directly in the resultant mixture. A phase transition range from −5° C. to 9° C. was derived from the electro-optical data. The characteristic temperature assumed here was exceptionally 9° C. The results are shown in the following table, Table 6, and likewise included in Table 1 for comparison.

TABLE 6

Characteristic voltages of Example 2d

| | Example: | |
|---|---|---|
| | C. 2 | 2d |
| Component (A) | AM-2 | |
| Component (B) | none | (1OPZPZ)2X* |
| Concentration (B)/% | 0 | 10 |
| Physical parameters | | |
| T$_{char.}$/° C. | 24.4 | 9 |
| Electrode separation 10 µm, electrode width 10 µm | | |
| Characteristic voltages | | |
| T − T(N, I)/° | V$_{70}$/V | |
| 1.0 | n.d. | 36.5 |
| 1.5 | n.d. | 38.5 |
| 2.0 | 59 | 40.5 |
| 2.5 | n.d. | 42.5 |
| 3.0 | n.d. | 44.5 |
| 4.0 | n.d. | 49 |
| 5.0 | n.d. | 52 |
| Temperature dependence | | |
| V$_{70}$(T(N, I) + 2°)/V | 59 | 40.5 |
| dV$_{70}$/dT/V/degree | 10 | 4 |
| dV*$_{70}$/dT/%/degree | 17 | 10 |

Notes:
see Table 1.

Examples 3a to 3f and Comparative Example 3

Comparative Example 3

As achiral starting mixture, the mixture AM-3 having the following composition was prepared.

| Composition | | |
|---|---|---|
| Compound | | Conc./ |
| # | Abbreviation | % by weight |
| 1 | GZU-3A-N | 15.0 |
| 2 | GZU-4A-N | 15.0 |
| 3 | GZU-4O-N | 15.0 |
| 4 | UZU-3A-N | 8.0 |
| 5 | CUZU-2-N | 9.0 |
| 6 | CUZU-3-N | 9.0 |
| 7 | CUZU-4-N | 9.0 |
| 8 | HP-3N.F | 6.0 |
| 9 | HP-4N.F | 6.0 |
| 10 | HP-5N.F | 8.0 |
| Σ | | 100.0 |
| Physical properties | | |
| T(N, I) = | | 56.8° C. |

This mixture was investigated as such. The characteristic temperature was 60° C. The results are shown in Table 7.

Examples 3a to 3c

As alternatives, 3%, 5% or 7% of the chiral compound B(OC)2C*H—C-3 used in Example 1 were added to the mixture AM-3 of Comparative Example 3 (Examples 3a, 3b and 3c respectively). The resultant mixtures had a phase transition into the blue phase at about 24° C., 36° C. and 46° C. respectively. The characteristic temperatures assumed here were 24.3° C., 36.3° C. and 45.9° C. respectively. The results are shown in Table 7 and those of Example 3b are likewise included in Table 1.

TABLE 7

Characteristic voltages of Examples 3a to 3c

| | Example: | | | |
|---|---|---|---|---|
| | C. 3 | 3a | 3b | 3c |
| Component (B) | | AM-3 | | |
| Component (A) | none | B(OC)2C*H—C-3 | | |
| Concentration (A)/% | 0 | 3.0 | 5.0 | 7.0 |
| Physical parameters | | | | |
| T(N, I)/° C. | 56.8 | n.d. | n.d. | n.d. |
| T$_{char.}$/° C. | 60 | 45.9 | 36.3 | 24.3 |
| Electrode separation 10 µm, electrode width 10 µm | | | | |
| Characteristic voltages | | | | |
| T − T(N, I)/° | V$_{70}$/V | | | |
| 0.5 | n.d. | 23 | 31 | 35 |
| 1.0 | 76 | 23.5 | 34 | 37 |
| 1.5 | 84 | 24.5 | 36 | 39 |
| 2.0 | 92 | 25 | 37 | 41 |
| 2.5 | 100 | 28 | 38 | 43 |
| 3.0 | 107 | n.d. | 39 | 45 |
| 4.0 | 121 | n.d. | 42 | 48 |
| 5.0 | 135 | n.d. | 46 | 50 |

TABLE 7-continued

Characteristic voltages of Examples 3a to 3c

| | Example: | | | |
|---|---|---|---|---|
| | C. 3 | 3a | 3b | 3c |
| Temperature dependence | | | | |
| $V_{70}(T_{char.} + 2°)/V$ | 92 | 25 | 37 | 41 |
| $dV_{70}/dT/V/degree$ | 15. | 3.5§ | 2.5 | 4 |
| $dV*_{70}/dT/\%/degree$ | 17 | 14§ | 6.8 | 9.6 |

Notes:
see Table 1.
§$dV_{70}/dT$: $[V_{70}(T_{char.} + 2.5°) − V_{70}(T_{char.} + 1.5°)/(1°)]$
$dV*_{70}/dT$: $[V_{70}(T_{char.} + 2.5°) − V_{70}(T_{char.} + 1.5°)/(V_{70}(T_{char.} + 1°) \cdot 1°)]$ Examples 3d to 3f The achiral starting mixture used was again the mixture AM-3 of Examples 3a to 3c.

10%, 13% or 16% of the chiral compound B(OC)2C*H—C-3 (used in Example 1) were added to this mixture (AM-3). The resultant mixtures (Examples 3d, 3e and 3f respectively) had a phase transition from the cholesteric phase into the blue phase at a temperature of 6° C. (Example 3d) or a minimum of the characteristic line of the characteristic voltages at temperatures of 1° C. (Example 3e) and 0.3° C. (Example 3f). The results are shown in the following table, Table 8.

TABLE 8

Characteristic voltages

| | Example: | | | |
|---|---|---|---|---|
| | C. 3 | 3d | 3e | 3f |
| Component (B) | | AM-3 | | |
| Component (A) | none | B(OC)2C*H—C-3 | | |
| Concentration (A)/% | 0 | 10.0 | 13.0 | 16.0 |
| Physical parameters | | | | |
| $T_{char.}/° C.$ | 60 | 6 | 1 | 0.3 |
| $\Delta T(BP)/degree$ | 0* | 17 | 33 | 35 |
| Electrode separation 10 μm, electrode width 10 μm | | | | |
| Characteristic voltages and temperature dependence | | | | |
| $T_{char} + 2°/degree$ | 62 | 25 | 3 | 2.3 |
| $V_{10}(T + 2°)/V$ | 60 | 33 | 50 | 79 |
| $dV_{10}/dT/V/degree$ | 10 | 1 | 1 | 1 |
| $dV*_{10}/dT/\%/degree$ | 17 | 3 | 2 | 1.2 |

Notes:
see Table 1
*it was not possible to observe a blue phase.

The invention claimed is:

1. An electro-optical light modulation element comprising
a substrate or a plurality of substrates,
an electrode arrangement,
an element or a plurality of elements for polarisation of the light and
mesogenic a modulation medium, wherein
the light modulation element is operated at the temperature at which the modulation medium in the unaddressed state is in an optically isotropic phase and
the mesogenic modulation medium comprises a chiral component, component (A), which consists of one or more chiral compounds, at least one of which has an HTP of 30 μm$^{−1}$ or more, and
the mesogenic modulation medium comprises an achiral component, component (B), which consists of one or more achiral compounds,
the light modulation element is operated at the temperature at which the mesogenic modulation medium has a blue phase or
the light modulation element is operated at the temperature at which the mesogenic modulation medium is in the isotropic phase, wherein
the relative temperature dependence ($dV*_{70}/dT$) of the characteristic voltage for 70% relative contrast ($V_{10}$) of the modulation medium is 30%/degree or less at a temperature of 2° above the characteristic temperature ($T_{char}$) in the range of +/−1° around this temperature.

2. Electro-optical light modulation element according to claim 1, wherein
the electrode arrangement is able to generate an electric field having a significant component parallel to the surface of the mesogenic modulation medium.

3. Electro-optical light modulation element according to claim 1, wherein
the mesogenic modulation medium has a blue phase.

4. Light modulation element according to claim 1, wherein the relative temperature dependence ($dV*_{70}/dT$) is 23%/degree or less.

5. The electro-optical light modulation element according to claim 1, wherein
the mesogenic modulation medium comprises a chiral component, component (A), which consists of two or more chiral compounds.

6. An electro-optical display containing one or more light modulation elements according to claim 1.

7. The electro-optical display according to claim 6, wherein the display is addressed by means of an active matrix.

8. An electro-optical display system containing one or more electro-optical displays according to claim 6.

9. The electro-optical display system according to claim 8, which is a television screen, as computer monitor or both.

10. A method for the display of video signals or of digital signals or information, comprising transmitting video signals or digital signals to a display according to claim 6.

11. The electro-optical light modulation element according to claim 1, wherein component (A) consists of one or more chiral components at least one of which has an HTP of 50 μm$^{−1}$ or more.

12. The electro-optical light modulation element according to claim 1, wherein component (A) consists of one or more chiral components at least one of which has an HTP of 90 μm$^{−1}$ or more.

13. An electro-optical light modulation element comprising
a substrate or a plurality of substrates,
an electrode arrangement,
an element or a plurality of elements for polarisation of the light and
a mesogenic modulation medium, wherein
the light modulation element is operated at the temperature at which the modulation medium in the unaddressed state is in an optically isotropic phase and
the mesogenic modulation medium comprises a chiral component, component (A), which consists of one or more chiral compounds, at least one of which has an HTP of 30 μm$^{−1}$ or more, and
the mesogenic modulation medium comprises an achiral component, component (B), which consists of one or more achiral compounds, the light modulation element is operated at the temperature at which the mesogenic modulation medium has a blue phase or the light modulation element is operated at the temperature at which the mesogenic modulation medium is in the isotropic phase and the characteristic voltage for 70% relative contrast ($V_{70}$) at a temperature of 2° above the characteristic temperature ($T_{char}$) of the modulation medium in cells is 80 V.

14. An electro-optical light modulation element comprising
   a substrate or a plurality of substrates,
   an electrode arrangement,
      an element or a plurality of elements for polarisation of the light and
   a mesogenic modulation medium, wherein
   the light modulation element is operated at the temperature at which the modulation medium in the unaddressed state is in an optically isotropic phase and
   the mesogenic modulation medium comprises a chiral component, component (A), which consists of two or more chiral compounds, at least one of which has an HTP of 30 $\mu m^{-1}$ or more, and
   the mesogenic modulation medium comprises an achiral component, component (B), which consists of one or more achiral compounds,
   the light modulation elemeny is operated at the temperature at which the mesogenic modulation medium has a blue phase or
   the light modulation element is operated at the temperature at which the mesogenic modulation medium is in the isotropic phase, and
   all the chiral compounds of component (A) have the same sign of the HTP at 20° C. in the reference mixture.

15. An electro-optical light modulation element, wherein
   a substrate or a plurality of substrates,
   an electrode arrangement,
      an element or a plurality of elements for polarisation of the light and
   a mesogenic modulation medium, wherein
   the light modulation element is operated at the temperature at which the modulation medium in the unaddressed state is in an optically isotropic phase and
   the mesogenic modulation medium comprises a chiral component, component (A), which consists of one or more chiral compounds, at least one of which has an HTP of 30 $\mu m^{-1}$ or more, and
   the mesogenic modulation medium comprises an achiral component, component (B), which consists of one or more achiral compounds,
   the light modulation element is operated at the temperature at which the mesogenic modulation medium has a blue phase or
   the light modulation element is operated at the temperature at which the mesogenic modulation medium is in the isotropic phase
   and either
      the dielectric susceptibility ($\epsilon_{av.}$) of the modulation medium at a temperature of 4 degrees above the conversion temperature from the blue phase or from the cholesteric phase into the isotropic phase is 40 or more, or
      the optical anisotropy at a temperature of 4 degrees below the transition temperature from the cholesteric phase into the isotropic phase is 0.050 or more.

16. The electro-optical light modulation element, wherein the optical anisotropy at a temperature of 4 degrees below the transition temperature from the cholesteric phase into the isotropic phase is 0.050 or more.

17. A mesogenic modulation medium which comprises
   (a) a chiral component, component (A), which consists of one or more chiral compounds at least one of which has an HTP of 30 $\mu m^{-1}$ or more, and
   (b) optionally an achiral component, component (B), which consists of one or more achiral compounds,
   the light modulation element is operated at the temperature at which the mesogenic modulation medium has a blue phase or
   the light modulation element is operated at the temperature at which the mesogenic modulation medium is in the isotropic phase, wherein
   the relative temperature dependence ($dV^{*}_{70}/dT$) of the characteristic voltage for 70% relative contrast ($V_{70}$) of the modulation medium is 30%/degree or less at a temperature of 2° above the characteristic temperature ($T_{char}$) in the range of +/−1° around this temperature.

18. A medium according to claim 17, having a characteristic temperature in the range from 0° C. to 60° C.

19. A medium according to claim 17, having a blue phase, with a characteristic temperature in the range from −20° C. or below to 80° C.

20. A medium according to claim 19, wherein the blue phase has a temperature range of at least 5 degrees.

21. A medium according to claim 20, wherein the blue phase has a temperature range of at least 10 degrees.

* * * * *

UNITED STATES PATENT AND TRADEMARK OFFICE
CERTIFICATE OF CORRECTION

PATENT NO. : 7,440,160 B2
APPLICATION NO. : 10/535104
DATED : October 21, 2008
INVENTOR(S) : Heckmeier et al.

It is certified that error appears in the above-identified patent and that said Letters Patent is hereby corrected as shown below:

Column 75, line 60 reads "mesogenic a modulation medium, wherein" should read -- a mesogenic modulation medium, wherein --.

Column 76, line 15 reads "Electro-optical light modulation element according to" should read -- The electro-optical light modulation element according to --

Column 76, line 20 reads "Electro-optical light modulation element according to" should read -- The electro-optical light modulation element according to --

Column 76, line 23 reads "Light modulation element according to claim 1, wherein" should read -- The electro-optical light modulation element according to claim 1, wherein --.

Signed and Sealed this

Thirty-first Day of March, 2009

JOHN DOLL
*Acting Director of the United States Patent and Trademark Office*